US010636329B2

(12) United States Patent
Li et al.

(10) Patent No.: US 10,636,329 B2
(45) Date of Patent: Apr. 28, 2020

(54) LABEL SHEET ASSEMBLY WITH IMPROVED PRINTER FEEDING

(71) Applicant: CCL Label, Inc., Framingham, MA (US)

(72) Inventors: Stephen Li, Huntington Beach, CA (US); Martin Utz, Bavaria (DE)

(73) Assignee: CCL Label, Inc., Framingham, MA (US)

(*) Notice: Subject to any disclaimer, the term of this patent is extended or adjusted under 35 U.S.C. 154(b) by 0 days.

(21) Appl. No.: 15/331,988

(22) Filed: Oct. 24, 2016

(65) Prior Publication Data
US 2017/0116890 A1    Apr. 27, 2017

Related U.S. Application Data

(60) Provisional application No. 62/245,369, filed on Oct. 23, 2015, provisional application No. 62/381,714, filed on Aug. 31, 2016.

(51) Int. Cl.
*G09F 3/10* (2006.01)
*G09F 3/00* (2006.01)
(Continued)

(52) U.S. Cl.
CPC ............ *G09F 3/10* (2013.01); *B32B 3/266* (2013.01); *B32B 7/12* (2013.01); *G09F 3/0288* (2013.01);
(Continued)

(58) Field of Classification Search
CPC .. G09F 3/10; G09F 3/0288; G09F 2003/0226; G09F 2003/0202;
(Continued)

(56) References Cited

U.S. PATENT DOCUMENTS 2,276,297 A    3/1942   Flood
2,303,346 A    12/1942  Flood
(Continued)

FOREIGN PATENT DOCUMENTS

DE    1296363 B    5/1969
DE    4003129      8/1990
(Continued)

OTHER PUBLICATIONS

Machine translation of JP 2010-120234, dated Feb. 27, 2018. (Year: 2018).*

(Continued)

*Primary Examiner* — Patricia L. Nordmeyer
(74) *Attorney, Agent, or Firm* — McDonald Hopkins LLC

(57) ABSTRACT

A label sheet assembly and method is disclosed for improving the process of feeding label sheets through a printer. The label sheet assembly may include a facestock layer and a liner sheet. The facestock layer may include an adhesive layer along at least a portion of a first side and include a label surface along at least a portion of the second side opposite the adhesive layer. The facestock layer may include at least one cut line that defines at least one label within the facestock layer while the remaining portions of the facestock layer may be a matrix portion. The matrix portion may include at least one discontinuous cut line spaced from the cut line that defines at least one label wherein the discontinuous cut line may create a zone of decreased bending stiffness along the label sheet assembly.

12 Claims, 21 Drawing Sheets

(51) Int. Cl.
*G09F 3/02* (2006.01)
*B32B 7/12* (2006.01)
*B32B 3/26* (2006.01)

(52) U.S. Cl.
CPC .. *B32B 2519/00* (2013.01); *G09F 2003/0201* (2013.01); *G09F 2003/0202* (2013.01); *G09F 2003/0226* (2013.01); *G09F 2003/0269* (2013.01)

(58) Field of Classification Search
CPC ..... G09F 2003/0201; G09F 2003/0269; B32B 7/12; B32B 3/266; B32B 2519/00
See application file for complete search history.

(56) References Cited

U.S. PATENT DOCUMENTS

| | | |
|---|---|---|
| 2,331,019 A | 10/1943 | Flood |
| 2,434,545 A | 1/1948 | Brady |
| 2,679,928 A | 6/1954 | Bishop |
| 2,765,205 A | 10/1956 | Capella |
| 2,883,044 A | 4/1959 | Kendrick |
| 3,038,597 A | 6/1962 | Brady |
| 3,228,710 A | 1/1966 | Chodorowski |
| 3,480,198 A | 11/1969 | Repko |
| 3,568,829 A | 3/1971 | Brady |
| 3,822,492 A | 7/1974 | Crawley |
| 3,854,229 A | 12/1974 | Morgan |
| 3,896,246 A | 7/1975 | Brady |
| 3,914,483 A | 10/1975 | Stipek |
| 4,032,679 A | 6/1977 | Aoyagi |
| 4,217,164 A | 8/1980 | La Mers |
| 4,264,662 A | 4/1981 | Taylor |
| 4,428,857 A | 1/1984 | Taylor |
| 4,446,183 A | 5/1984 | Savagian |
| 4,524,095 A | 6/1985 | Gocket |
| 4,648,930 A | 3/1987 | La Mers |
| 4,706,877 A | 11/1987 | Jenkins |
| 4,881,935 A | 11/1989 | Slobodkin |
| 4,881,936 A | 11/1989 | Slobodkin |
| 4,910,058 A | 3/1990 | Jameson |
| 4,951,970 A | 8/1990 | Burt |
| 4,952,433 A | 8/1990 | Tezuka |
| 5,011,559 A | 4/1991 | Felix |
| 5,091,035 A | 2/1992 | Anhaeuser |
| 5,182,152 A | 1/1993 | Ericson |
| 5,192,612 A | 3/1993 | Otter |
| 5,230,938 A | 7/1993 | Hess |
| 5,324,153 A | 6/1994 | Chess |
| 5,328,538 A | 7/1994 | Garrison |
| 5,346,766 A | 9/1994 | Otter |
| 5,389,414 A | 2/1995 | Popat |
| 5,407,718 A | 4/1995 | Popat |
| 5,484,168 A | 1/1996 | Chigot |
| 5,487,929 A | 1/1996 | Rusincovitch |
| 5,520,990 A | 5/1996 | Rotermund |
| 5,536,546 A | 7/1996 | Nash |
| 5,633,071 A | 5/1997 | Murphy |
| 5,658,631 A | 8/1997 | Bernstein |
| 5,662,976 A | 9/1997 | Popat |
| 5,686,159 A | 11/1997 | Langan |
| 5,700,535 A | 12/1997 | Galsterer |
| 5,756,175 A | 5/1998 | Washburn |
| 5,788,284 A | 8/1998 | Hirst |
| 5,866,249 A | 2/1999 | Yarusso |
| 5,947,525 A | 9/1999 | Pollman |
| 5,997,683 A | 12/1999 | Popat |
| 6,001,209 A | 12/1999 | Popat |
| 6,004,643 A | 12/1999 | Scheggetman |
| 6,132,829 A | 10/2000 | Kennerly |
| 6,136,130 A | 10/2000 | Tataryan |
| 6,159,570 A | 12/2000 | Ulrich |
| 6,170,879 B1 | 1/2001 | Rawlings |
| 6,284,708 B1 | 9/2001 | Oshima |
| 6,361,078 B1 | 3/2002 | Chess |
| 6,391,136 B1 | 5/2002 | Stickelbrocks |
| 6,403,184 B1 | 6/2002 | Michlin |
| 6,410,111 B1 | 6/2002 | Roth |
| 6,413,604 B1 | 7/2002 | Matthews |
| 6,517,921 B2 | 2/2003 | Ulrich |
| 6,521,312 B1 | 2/2003 | Keiser |
| 6,579,585 B1 | 6/2003 | Garvic |
| 6,656,555 B1 | 12/2003 | McKillip |
| 6,803,084 B1 | 10/2004 | Do |
| 6,837,957 B2 | 1/2005 | Flynn |
| 6,860,050 B2 | 3/2005 | Flynn |
| 6,905,747 B2 | 6/2005 | Auchter |
| 6,926,942 B2 | 8/2005 | Garvic |
| 7,459,193 B2 | 12/2008 | Utz |
| 2002/0011306 A1 | 1/2002 | Hannington |
| 2002/0086127 A1 | 7/2002 | Hodsdon |
| 2002/0096874 A1 | 7/2002 | Viby |
| 2004/0033326 A1 | 2/2004 | Tataryan |
| 2004/0050854 A1 | 3/2004 | Presutti |
| 2004/0101646 A1 | 5/2004 | Hodsdon |
| 2004/0101648 A1 | 5/2004 | Mulvey |
| 2004/0213943 A1 | 10/2004 | Viby |
| 2005/0233587 A1 | 10/2005 | Baleras |
| 2006/0110565 A1 | 5/2006 | Tataryan |
| 2006/0125230 A1 | 6/2006 | Laurash et al. |
| 2006/0210754 A1 | 9/2006 | Presutti |
| 2007/0114789 A1 | 5/2007 | Morrish |
| 2014/0106132 A1 | 4/2014 | Hong et al. |

FOREIGN PATENT DOCUMENTS

| | | |
|---|---|---|
| DE | 19724648 A1 | 12/1998 |
| EP | 0418608 | 3/1991 |
| EP | 1382458 A1 | 1/2004 |
| GB | 2177373 A | 1/1987 |
| JP | 56-145069 | 11/1981 |
| JP | 6011370 | 1/1985 |
| JP | 6443380 | 3/1993 |
| JP | H0511575 A | 3/1993 |
| JP | H07306641 | 11/1995 |
| JP | H08137403 | 5/1996 |
| JP | 11030954 | 2/1999 |
| JP | H1145051 A | 2/1999 |
| JP | 2001101827 A | 4/2001 |
| JP | 200282615 | 3/2002 |
| JP | 2003150058 A | 5/2003 |
| JP | 2005128458 A | 5/2005 |
| JP | 2008058450 A | 3/2008 |
| JP | 2010120234 A | 6/2010 |
| JP | 2013074100 A | 4/2013 |
| WO | WO1997001495 A1 | 1/1997 |
| WO | WO1999031644 A1 | 6/1999 |
| WO | WO2000032412 A1 | 6/2000 |
| WO | WO2001084550 A1 | 11/2001 |
| WO | WO2001089825 A1 | 11/2001 |
| WO | WO2002026483 A1 | 4/2002 |
| WO | WO2004078468 | 9/2004 |

OTHER PUBLICATIONS

Patent Cooperation Treaty (PCT), International Search Report and Written Opinion for Application PCT/US2016/058180 filed Oct. 21, 2016, dated Jan. 3, 2017, European Patent Office, Netherlands.
Written Opinion dated Feb. 14, 2005 from International Application No. PCT/EP04/006324 filed Jun. 11, 2004.
International Preliminary Report on Patentability dated Aug. 2, 2005 from International Application No. PCT/EP04/006324 filed Jun. 11, 2004.
International Search Report dated Feb. 16, 2005 from International Application No. PCT/EP04/006324 filed Jun. 11, 2004.
Supplemental European Search Report dated Oct. 4, 2007 from European Application No. 03713742.9.
European Patent Office, International Search Report and Written Opinion for PCT/US09/041586, dated Dec. 4, 2009, 8 pages.

* cited by examiner

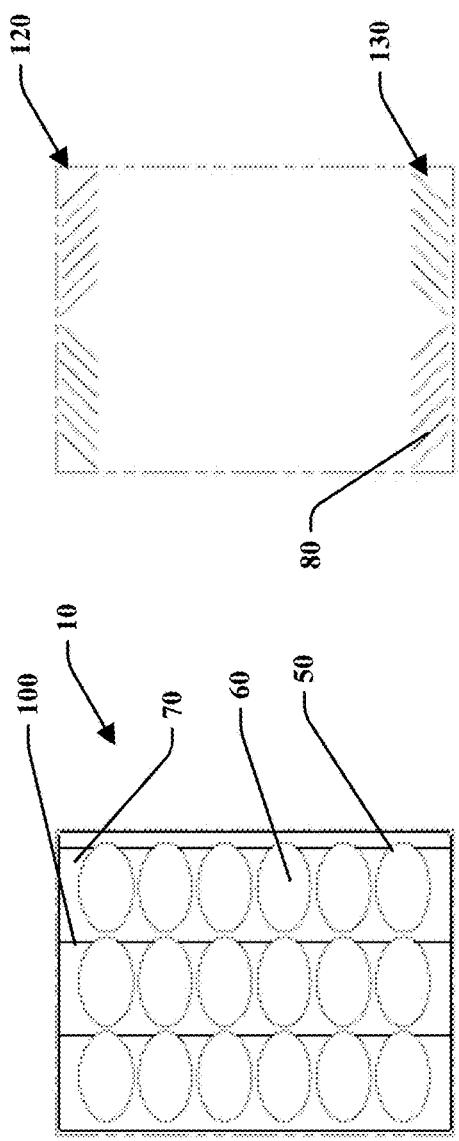
FIG. 5A
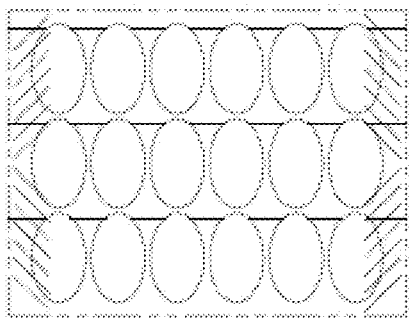
FIG. 5C
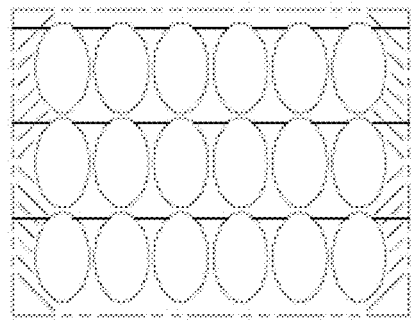
FIG. 5F
FIG. 5B
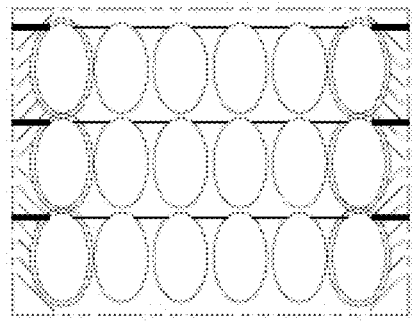
FIG. 5E
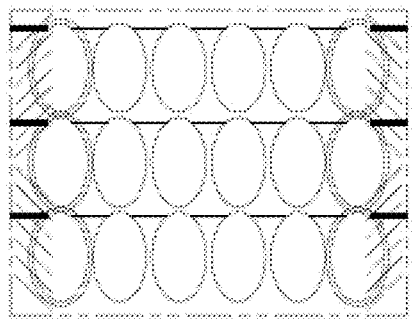
FIG. 5D

LABEL SHEET ASSEMBLY WITH IMPROVED PRINTER FEEDING

CROSS REFERENCE TO RELATED APPLICATION

This application claims priority to U.S. Provisional Patent Application No. 62/381,714, titled "LABEL SHEET ASSEMBLY WITH IMPROVED PRINTER FEEDING," filed Aug. 31, 2016, and to U.S. Provisional Patent Application No. 62/245,369, titled "LABEL SHEET ASSEMBLY WITH IMPROVED PRINTER FEEDING," filed Oct. 23, 2015, each are hereby incorporated by reference in its entirety.

FIELD OF INVENTION

The present disclosure generally relates to a method and assembly of a sheet of labels that is configured to be processed through a printer to print indicia thereon. More particularly, the disclosure relates to a label sheet assembly that is configured to be processed through the printer in an efficient manner.

BACKGROUND

Labels and label sheets are well known and various types have been proposed to meet the requirements of a wide variety of label applications. For example, labels are extensively used in retail businesses for communicating product information to customers. Labels generally include a facestock layer with an adhesive side and an exposed side. The exposed side includes a surface for receiving label indicia thereon and is opposite from the adhesive side. A liner sheet is operably attached to the adhesive side and is configured to allow a user to peel the label portion of the facestock from the liner sheet to be placed on a substrate. A plurality of cut lines may separate the facestock layer into a plurality of labels in various arrangements.

Many label sheets are configured to be feed through a printer to print ink on the surface of the labels. For example, U.S. Pat. No. 7,709,071 to Wong et al. discloses a particular type of label sheet assembly that is configured to be fed through a printer and also allows a user to easily remove labels by hand. This patent is incorporated by reference in its entirety. These label sheet assemblies allow a user broad discretion as to the orientation of the label and the indicia to be printed thereon. However, problems arise when a user processes label sheets through a printer, such as an inkjet printer, desktop printer, or laser printer. Many printers are configured to receive a label sheet or other sheet and process it through at least one, but usually more than one, rotary mechanisms during the printing process. These processes may cause portions of the label sheet assembly to become creased, manipulated or otherwise disengaged. This may cause ink to shift or labels to be moved relative the remaining facestock layer or liner sheet. Labels risk damage and indicia may not be accurately printed along the labels.

Therefore, there is a need for a label sheet assembly having a facestock and liner material that can be configured to reduce inconsistent processing through a printer. There is also a need for an improved method of feeding a label sheet through a printer to accurately apply ink or indicia thereon without unduly manipulating the orientation of the labels or label sheet assembly.

SUMMARY

A label sheet assembly is provided as shown and described herein. The label sheet assembly may include a facestock layer having at least one cut line that defines at least one label and a matrix portion wherein the facestock layer is configured to receive indicia thereon. An adhesive layer and a liner sheet layer. A plurality of discontinuous cut lines may be positioned along the matrix portion wherein the discontinuous cut lines may create a zone of decreased bending stiffness along the label sheet assembly. The matrix portion may extend from the at least one label to an edge of the label sheet assembly. The matrix portion may include at least one discontinuous cut line spaced from the cut line that defines at least one label. The facestock layer may be a label and may include at least one weakened separation line that divides the sheet assembly into multiple sections. The facestock layer may include a plurality of edges and the plurality of discontinuous cut lines may be generally parallel relative to each other and have a generally diagonal orientation relative to the plurality of edges along a feed direction of the sheet assembly. The label sheet assembly may include a header and an opposite footer wherein the plurality of discontinuous cut lines may be provided along the header or footer of the label sheet assembly.

In one embodiment, provided is a label sheet assembly that may include a facestock layer having at least one cut line that defines at least one label and a matrix portion. The facestock layer may be configured to receive indicia thereon. The facestock layer may include a first edge and an opposite second edge along with a third edge and an opposite fourth edge such that the edges may intersect to form a generally rectangular sheet assembly wherein the first and second edges define a feed direction such that the label sheet assembly may be configured to be fed into a conventional printer from the first edge or the second edge. The label sheet assembly may include a liner sheet layer attached to the facestock layer with an adhesive layer between the liner sheet layer and the facestock layer. A plurality of discontinuous cut lines may be positioned along the matrix portion to create a zone of decreased bending stiffness along the label sheet assembly. The plurality of discontinuous cut lines may extend between the at least one label and the first, second, third, and fourth edges. The plurality of discontinuous cut lines may be generally straight cut lines and include a generally diagonal orientation relative to the first, second, third, and fourth edges. The plurality of discontinuous cut lines may be spaced from the at least one cut line that defines the label and the first, second, third, and fourth edges. The plurality of discontinuous cut lines may be generally parallel relative to each other and have a generally diagonal orientation relative to the first and second edges along the feed direction of the sheet assembly.

The label sheet assembly may include a first group of the plurality of discontinuous cut lines oriented in a first generally diagonal orientation and a second group of the plurality of discontinuous cut lines oriented in a second generally diagonal orientation wherein the first group have an opposite diagonal orientation from the second group. The first group of discontinuous cut lines may extend between the third edge and a center axis of the sheet assembly and the second group of discontinuous cut lines may extend between the fourth edge and the center axis of the sheet assembly. The first group and second group of discontinuous cut lines may form an apex along the center axis of the sheet adjacent at least one of the first and second edges. The label sheet may include a first separation line that extends from the first edge to the second edge and the label sheet may include a second separation line that extends from the third edge to the fourth edge. In one embodiment, the label sheet assembly may include quadrants having discontinuous cut lines arranged within the matrix portions of the facestock wherein each quadrant includes discontinuous cut lines arranged in a first group oriented in a first generally diagonal orientation or a second group oriented in a second generally diagonal orientation wherein the first group of discontinuous cut lines has an opposite diagonal orientation from the second group.

In another embodiment, provided is a method of feeding a label sheet assembly through a printer. The method may include providing a sheet assembly having a facestock layer, an adhesive layer, and a liner sheet. A cut line may be cut into the facestock layer to define at least one label and a matrix portion. At least one discontinuous cut line may be aligned along the matrix portion. At least one discontinuous cut line may be cut along the matrix portion that is spaced from the cut line that defines at least one label wherein the discontinuous cut lines create a zone of decreased bending stiffness along the matrix portion of the label sheet assembly. The label sheet assembly may be fed into a printer to print indicia thereon. In one embodiment, a first group of a plurality of discontinuous cut lines that are oriented in a first generally diagonal orientation may be aligned along the matrix portion and a second group of the plurality of discontinuous cut lines that are oriented in a second generally diagonal orientation may be aligned along the matrix portion wherein the first group have an opposite diagonal orientation from the second group. Additionally, the first group and the second group of discontinuous cut lines may be aligned to form an apex along a center axis of the sheet assembly.

BRIEF DESCRIPTION OF THE DRAWINGS

Operation of the disclosure may be better understood by reference to the following detailed description taken in connection with the following illustrations, wherein:

FIGS. 5A-5F are plan views of various steps of an embodiment of a method for creating the label sheet assembly in accordance with the present disclosure;

DETAILED DESCRIPTION

Reference will now be made in detail to embodiments of the present disclosure, examples of which are illustrated in the accompanying drawings. It is to be understood that other embodiments may be utilized and structural and functional changes may be made without departing from the respective scope of the disclosure. Moreover, features of the various embodiments may be combined or altered without departing from the scope of the disclosure. As such, the following description is presented by way of illustration only and should not limit in any way the various alternatives and modifications that may be made to the illustrated embodiments and still be within the spirit and scope of the disclosure.

A label sheet assembly 10 is disclosed and may be of any appropriate configuration and is not limited to that shown and described herein. It should similarly be understood that the sheet assembly 10 may be adapted to any appropriate size, including, without limitation, 8.5 inches by 11 inches, A4 size, legal size or any other size. The sheet assembly 10 may be made of any appropriate materials and colors or indicia and this disclosure is not limited in this regard.

Figure 1A:
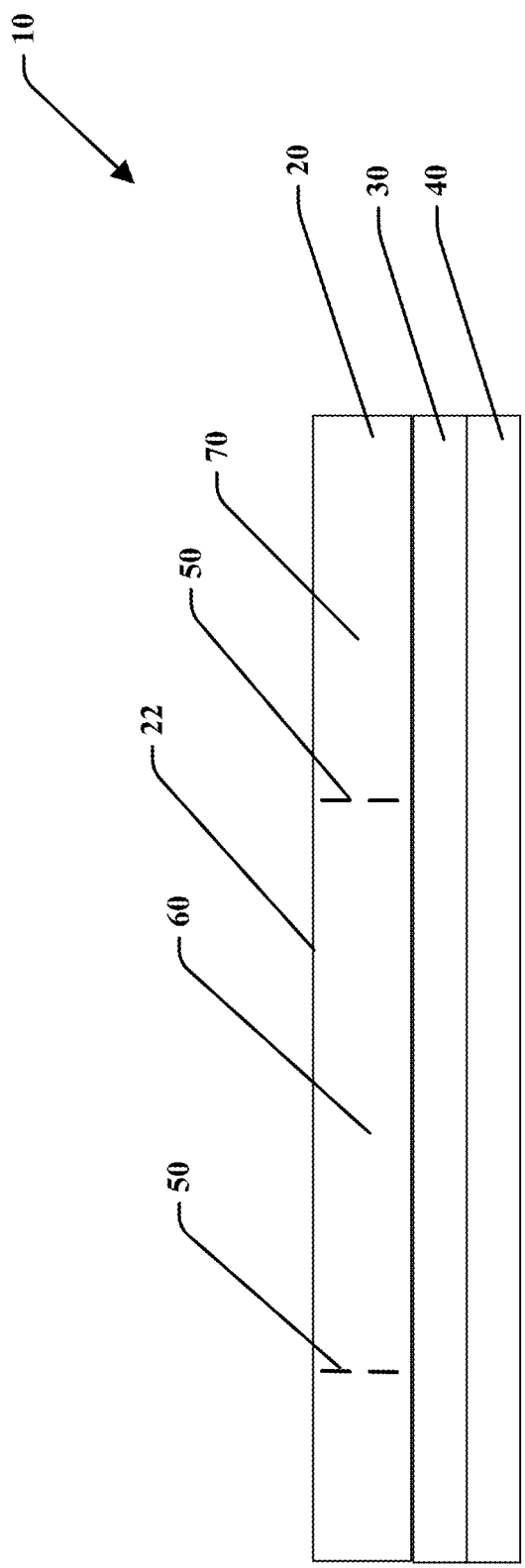
FIG. 1A is a cross sectional view of an embodiment of a label sheet assembly of the present disclosure.

FIG. 1A is a cross sectional side view of the sheet assembly 10 that may include a facestock layer 20 which may be coated with a pressure sensitive adhesive layer 30. Sheet assembly 10 may also include a liner sheet 40 attached to the adhesive layer 30. The liner sheet 40 may include a release coating for supporting the adhesive layer 30. The liner sheet 40 may be made of any appropriate material, including, without limitation a calendared paper or polymer film. The facestock layer 20 may be of any appropriate material, including without limitation a paper, plastic or polymer material such as a polyester material or other transparent, translucent or semi-translucent material. The facestock layer 20 may also be a laminate or a label or combination of both. The facestock layer may have a top surface 22 that is configured to receive indicia thereon.

Figure 1B:
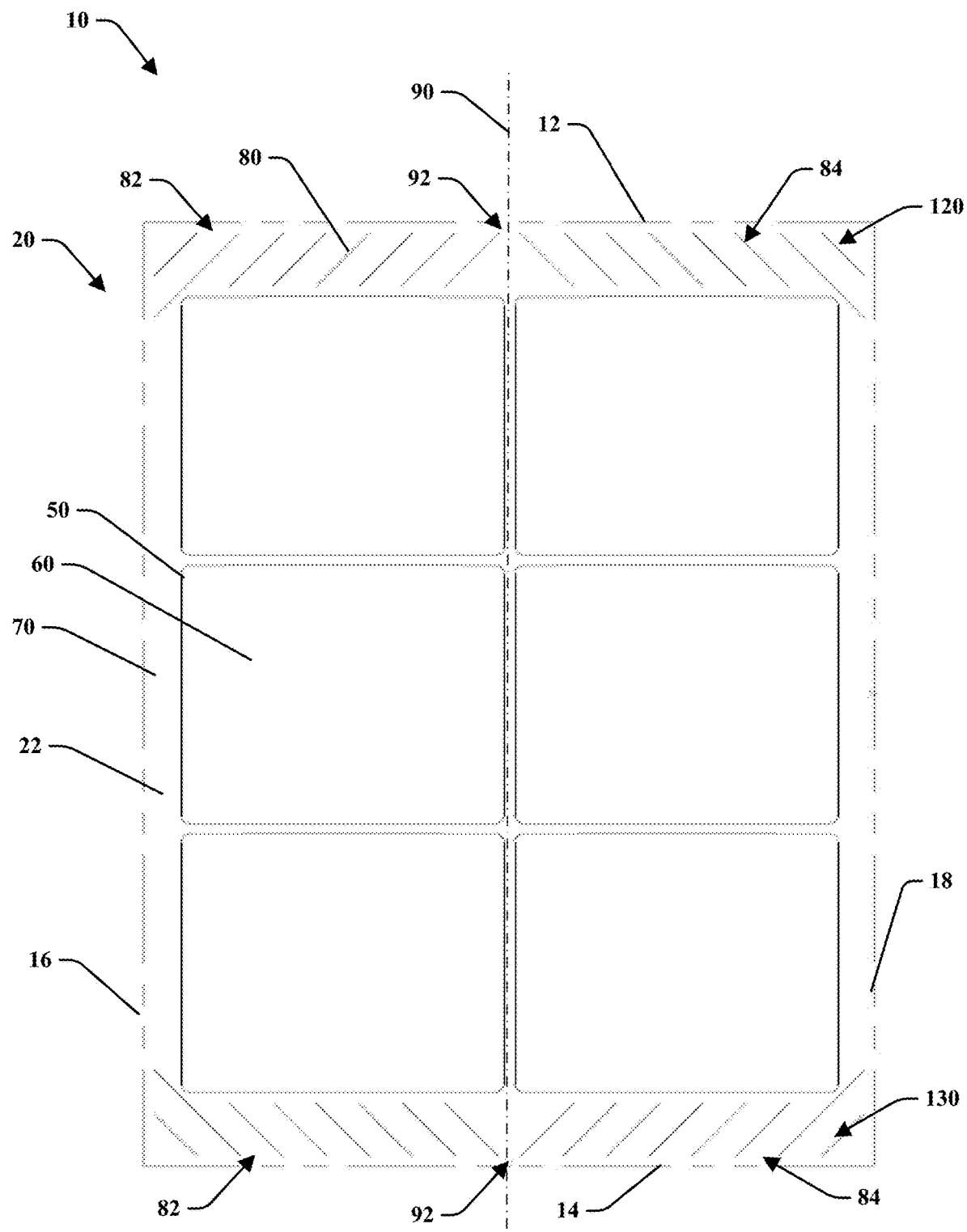
FIG. 1B is a plan view of an embodiment of a label sheet assembly of the present disclosure with a plurality of discontinuous cut lines.

As illustrated by FIG. 1B, the top surface 22 of facestock layer 20 of the sheet assembly 10 is shown in plan view. The sheet assembly 10 may include at least one cut line 50 that may extend through the facestock layer 20 to separate that sheet assembly into at least one label 60 and a matrix portion 70. In this embodiment, the facestock layer 20 includes six (6) labels 60 having a generally rectangular shape with rounded corners. However, this application is not limited as to the configuration, amount, or size of the labels 60. Various embodiments of these particular sizes are illustrated by FIGS. 2-4 and 6-10 of which this application is not merely limited to these configurations. The label sheet assembly 10 may include a first edge 12 and opposite second edge 14 along with a third edge 16 and opposite fourth edge 18. These edges 12, 14, 16, 18 may intersect to form a generally rectangular sheet assembly wherein the label sheet assembly 10 may be configured to be fed into a conventional printer from any edge.

In the embodiment of FIG. 1B, the label sheet assembly 10 may include a plurality of discontinuous cut lines 80 positioned along the matrix portion 70. The discontinuous cut lines 80 may extend between the labels 60 and the first, second, third, and fourth edges 12, 14, 16, 18 as illustrated. The plurality of discontinuous cut lines 80 may be generally straight cut lines and may have a generally diagonal orientation relative to the edges and may be spaced from the cut lines 50 and the edges 12, 14, 16, 18. The plurality of discontinuous cut lines 80 may be generally parallel relative to each other and have a generally diagonal orientation relative to the first and second edges 12, 14 or otherwise along the feed direction of the sheet assembly 10. Further, there may be a first group 82 of discontinuous cut lines 80 that are oriented in a first generally diagonal orientation and a second group 84 of discontinuous cut lines that are oriented in a second generally diagonal orientation. The first group 82 may have an opposite diagonal orientation from the second group 84. The first group 82 of discontinuous cut lines 80 may extend between the third edge 16 to a center axis 90 of the sheet 10 along the first and second edges 12, 14. The second group 84 of discontinuous cut lines 80 may extend between the fourth edge 18 to the center axis 80 of the sheet 10 along the first and second edges 12, 14. The first group and second group 82, 84 may form an apex 92 along the center axis of the sheet 10 adjacent the first and second edges 12, 14.

As such, known facestock and liner layers may have experienced difficulty being fed through printers due to the level of rigidity of the sheet assembly. The discontinuous cut lines 80 are added to improve the way in which label sheet assemblies 10 are fed through printers to receive indicia on the labels. The discontinuous cut lines 80 may reduce lifting, shifting, or bending of the matrix portion 70 relative to the liner layer 40 and the labels 60 while undergoing stresses caused by processing the label sheet assembly 10 though the printer. The discontinuous cut lines 80 may have various orientations that reduce bending stiffness of the assembly without creating a sharp bend in the sheet after being processed through a printer. The discontinuous cut lines 80 may extend through the facestock layer 20. Alternatively, the discontinuous cut lines may extend through the facestock layer 20 and the liner layer 40. These cuts 80 may be kiss cut to maintain sheet integrity.

The discontinuous cut lines 80 may be placed along the sheet to create a weakened region that helps to allow the sheet to fold along this region. These cut lines 80 may be strategically placed relative to a grouping of labels 60 in alignment along the top or bottom thereof. Additionally, the design discontinuous cut lines 80 may be centered along a header 120 or footer 130 of the label sheet assembly 10. The weakened region could be a perforation or it could be a region with less material, or lower caliper, which makes the region a preferred area to fold. Additionally, the discontinuous cut lines 80 may reduce stiffness of the header 120 or footer 130 regions of the label sheet assembly by breaking fiber formation along the first and second edges 12, 14. The discontinuous cut lines 80 may reduce the bending resistance of the leading edges 12 and trailing edges 14 of the label sheet assembly 10 and may be formed such that they have minimal impact on the smoothness of the liner sheet 40 to minimize likelihood of adjacent sheets to nest or stick together. Otherwise, sheet nesting of adjacent sheets may result in the error of more than one sheet being fed into a printer at once.

Figure 2:
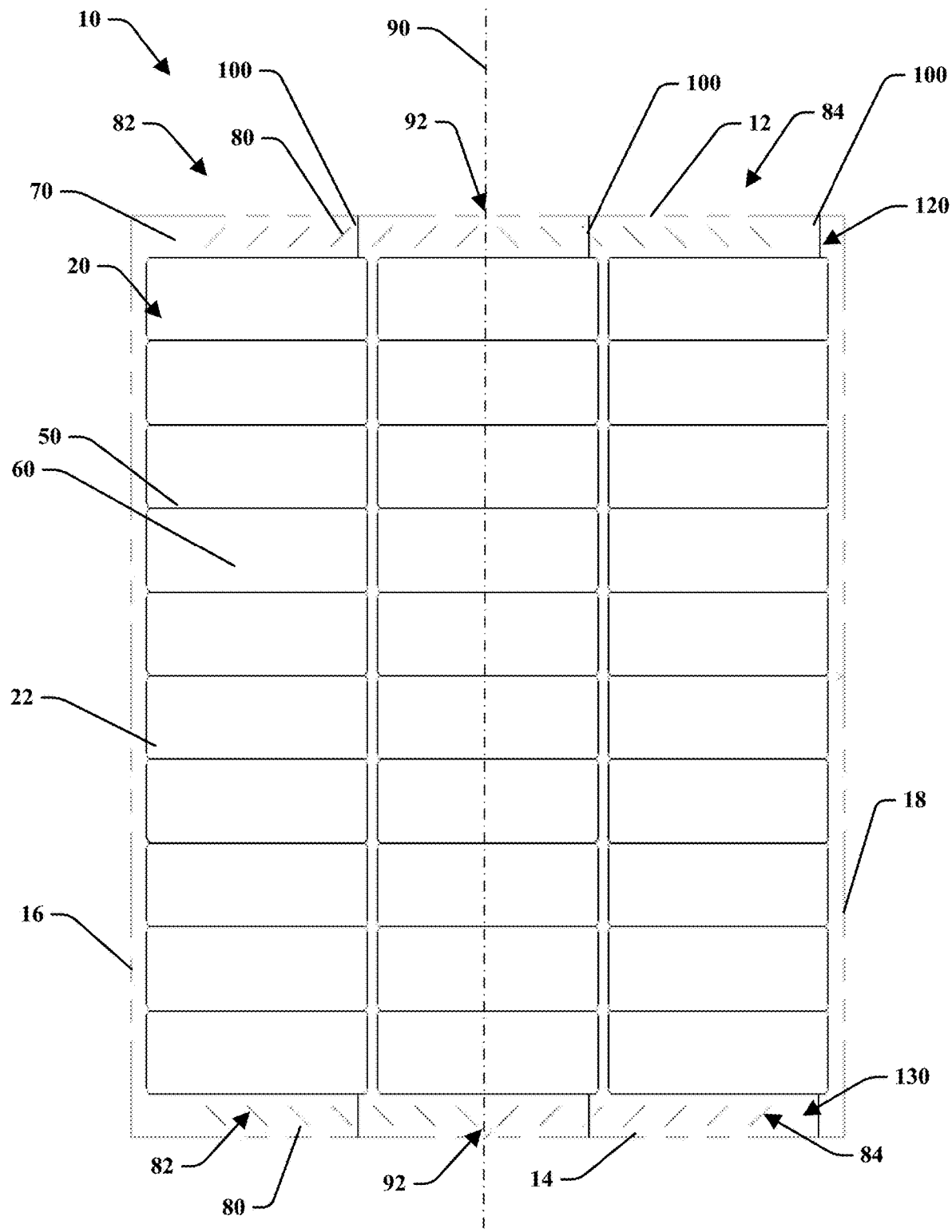
FIG. 2 is a plan view of an embodiment of the label sheet assembly with a plurality of separation lines and discontinuous cut lines.

FIG. 2 illustrates a sheet assembly 10 having a plurality of die cut lines 50 that define a plurality of labels 60. In this embodiment, a plurality of weakened separation lines 100 may extend from the first edge 12 to the second edge 14. The weakened separation lines 100 may be formed through portions of the facestock layer 20 along the matrix portion 70 and formed through the liner sheet 40. The weakened separation lines 100 and label sheet assembly 10 may be configured as described by commonly owned U.S. Pat. No. 7,709,071, which is incorporated herein by reference. In the embodiment of FIG. 2, the label sheet assembly 10 may include a plurality of discontinuous cut lines 80 positioned along the matrix portion 70. The discontinuous cut lines 80 may extend between the labels 60 and the first, second, third, and fourth edges 12, 14, 16, 18 as illustrated. The plurality of discontinuous cut lines 80 may each have a common length. The plurality of discontinuous cut lines 80 may have a generally diagonal orientation relative to the edges 12, 14, 16, 18 and may be spaced from the cut lines 50 and the edges 12, 14, 16, 18. The plurality of discontinuous cut lines 80 may be generally parallel relative to each other. Further, there may be a first group 82 of discontinuous cut lines 80 that are oriented in a first diagonal orientation and a second group 84 of discontinuous cut lines that are oriented in a second diagonal orientation. The first group 82 may have an opposite diagonal orientation from the second group 84. The first group 82 of discontinuous cut lines 80 may extend between the third edge 16 to a center axis 90 of the sheet 10 along the first and second edges 12, 14. The second group 84 of discontinuous cut lines 80 may extend between the fourth edge 18 to the center axis 80 of the sheet 10 along the first and second edges 12, 14. The first group and second group 82, 84 may form an apex 92 along the center axis of the sheet 10 adjacent the first and second edges 12, 14.

Figure 3:
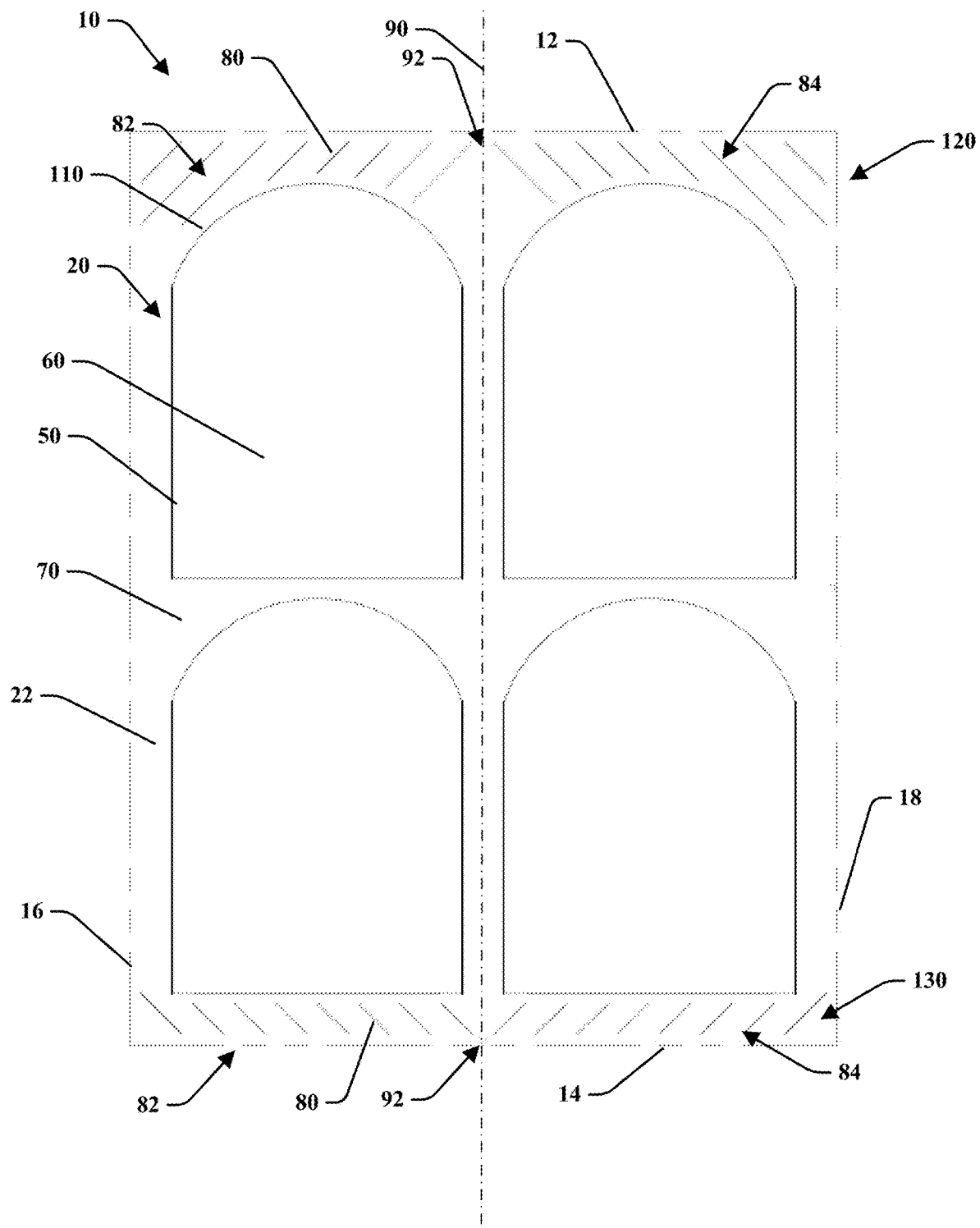
FIG. 3 is a plan view of an embodiment of the label sheet assembly in accordance with one aspect of the present disclosure.

FIG. 3 illustrates an embodiment of the sheet assembly 10 having a plurality of die cut lines 50 that define a plurality of labels 60. In this embodiment, the labels 60 are defined by cut lines 50 having at least one curvilinear side 110. In the embodiment of FIG. 3, the label sheet assembly 10 may include a plurality of discontinuous cut lines 80 positioned along the matrix portion 70. The discontinuous cut lines 80 may extend between the labels 60 and the first, second, third, and fourth edges 12, 14, 16, 18 as illustrated. The plurality of discontinuous cut lines 80 may each have a common length along the second edge 14. Additionally, the plurality of discontinuous cut lines 80 may each have different lengths adjacent the first edge 12 such that the discontinuous cut lines 80 may extend between the curvilinear side 110 of the labels 60 and the first edge 12 of the assembly 10. The plurality of discontinuous cut lines 80 may have a generally diagonal orientation relative to the edges and may be spaced from the cut lines 50 and the edges 12, 14, 16, 18. The plurality of discontinuous cut lines 80 may be generally parallel relative to each other. Further, there may be a first group 82 of discontinuous cut lines 80 that are oriented in a first generally diagonal orientation and a second group 84 of discontinuous cut lines that are oriented in a second generally diagonal orientation. The first group 82 may have an opposite diagonal orientation from the second group 84, but the present teachings are not limited to this configuration. The first group 82 of discontinuous cut lines 80 may extend between the third edge 16 to the center axis 90 of the sheet 10 along the first and second edges 12, 14. The second group 84 of discontinuous cut lines 80 may extend between the fourth edge 18 to the center axis 80 of the sheet 10 along the first and second edges 12, 14. The first group and second group 82, 84 may form an apex 92 generally along the center axis of the sheet 10 adjacent the first and second edges 12, 14.

Figure 4:
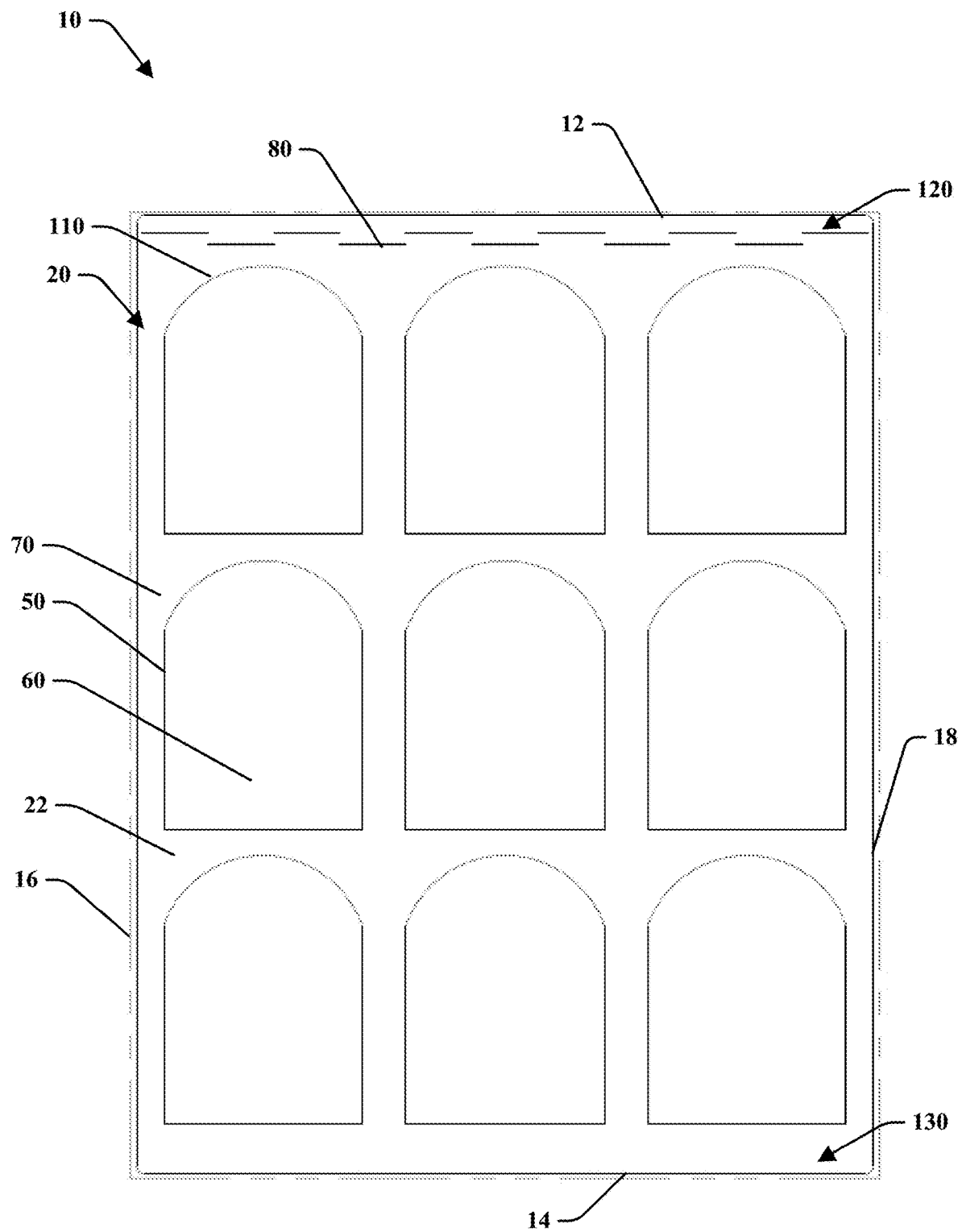
FIG. 4 is a plan view of an embodiment of the label sheet assembly in accordance with an embodiment of the present disclosure.
Figure 6:
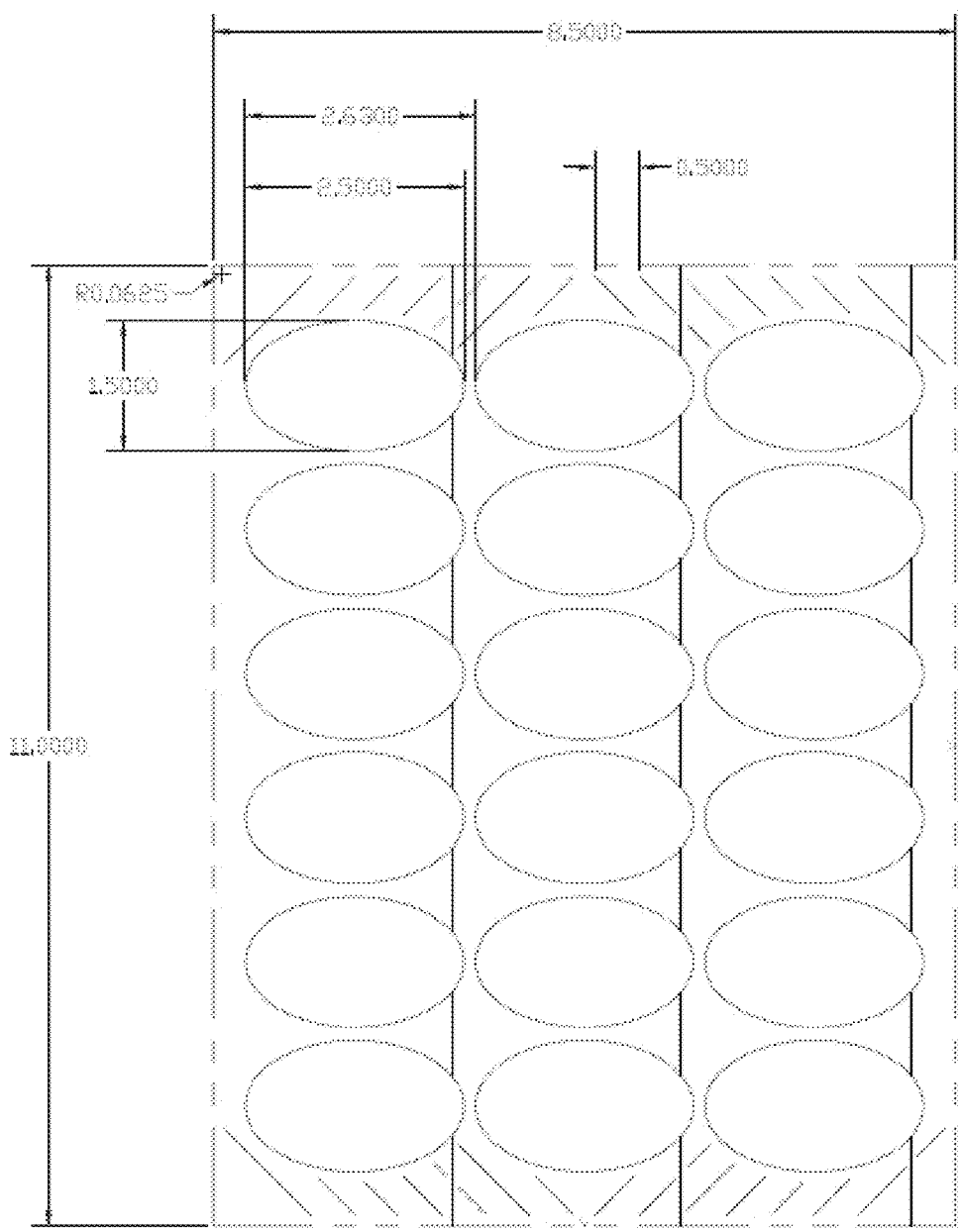
FIG. 6 is a plan view of an embodiment of the label sheet assembly in accordance with an embodiment of the present disclosure.

FIG. 4 illustrates an embodiment of the sheet assembly 10 having a plurality of die cut lines 50 that define a plurality of labels 60. In this embodiment, the labels 60 are defined by cut lines 50 having at least one curvilinear side 110. In the embodiment of FIG. 4, the label sheet assembly 10 may include a plurality of discontinuous cut lines 80 positioned along the matrix portion 70. The discontinuous cut lines 80 may extend between the labels 60 and the first, second, third, and fourth edges 12, 14, 16, 18 as illustrated. The plurality of discontinuous cut lines 80 may each have a common length and be positioned between the first edge 14 and the curvilinear side 110 of the plurality of labels 60. Additionally, the plurality of discontinuous cut lines 80 may each have common lengths. The discontinuous cut lines 80 may have a generally parallel orientation relative to the first edge 12. The plurality of discontinuous cut lines 80 may also have an offset orientation relative to each other as they extend between the third edge 16 and the fourth edge 18

FIGS. 5A-5F illustrate a method of creating the label sheet assembly 10 with a plurality of discontinuous cut lines 80. The facestock layer 20 may be provided with the adhesive layer 30 along a first side and an indicia substrate 22 along an opposite second side. The liner sheet 40 may be attached to the adhesive layer 30 of the facestock layer 40. As illustrated by FIG. 5A, at least one cut line 50 is cut into the facestock layer 40 to define at least one label 60 and a matrix portion 70 of the facestock layer. FIG. 5A illustrates an example of a known design for a label sheet assembly. FIG. 5B illustrates a reference design for a plurality of discontinuous cut lines 80. In one embodiment, the discontinuous cut lines 80 are positioned adjacent a header 120 and footer 130 portions of the layout. The plurality of discontinuous cut lines 80 may each be generally straight and positioned in a relatively diagonal orientation relative to the edges along the header and footer. FIG. 5C illustrates the reference design of FIG. 5B positioned over the sheet assembly of FIG. 5A. In this embodiment, various adjustments may be made to the orientation of the various cut lines and perimeter of the label sheet assembly. For example, any perimeter strip cuts may be removed and weakened separations lines may be extended to the edges along the perimeter of the sheet assembly. In FIG. 5D, additional layout adjustments may be made to align the discontinuous cut lines 80 with the plurality of labels 60. In particular, the labels may be offset or positioned a dimension such as approximately 0.125" while the weakened separation lines may be offset a different dimension such as approximately 0.0625". At least one discontinuous cut line may be cut within the matrix portion and may be spaced from the cut line that defines at least one label such that the discontinuous cut line may create a zone of decreased bending stiffness along the matrix portion of the label sheet assembly. The label sheet assembly may be fed into a printer to print indicia thereon.

In one embodiment, the dimensions of the first and second edges 12, 14 may be between approximately 5 inches and 11 inches, or may be approximately 8.5 inches. The dimension of the third and fourth edges 16, 18 may be between approximately 7 inches and 18 inches, or more narrowly between approximately 11 inches and 14 inches. Alternately, the dimensions of the sheet assembly 10 may include dimensions that compare to standard US paper sizes including letter (8.5×11 in), legal (8.5×14 in), junior legal (5×8 in), and ledger/tabloid (11×17 in) sizes or standard international paper sizes such as A, B, and C paper sizes.

As illustrated by FIGS. 6-10, the label sheet assembly 10 may include various configurations having particular dimensions of facestock layers, labels, and matrix portions. The particular arrangement of discontinuous cut lines 80 in relation to the cut lines 50 that define the plurality of labels 60 and the matrix portion 70 provide a particular improvement over the prior art. In particular, the configuration of discontinuous cut lines 80 as illustrated by the embodiments of FIGS. 6-10 provide reduced bending stiffness of the label sheet assembly 10 as it is being fed through a printer.

Figure 7:
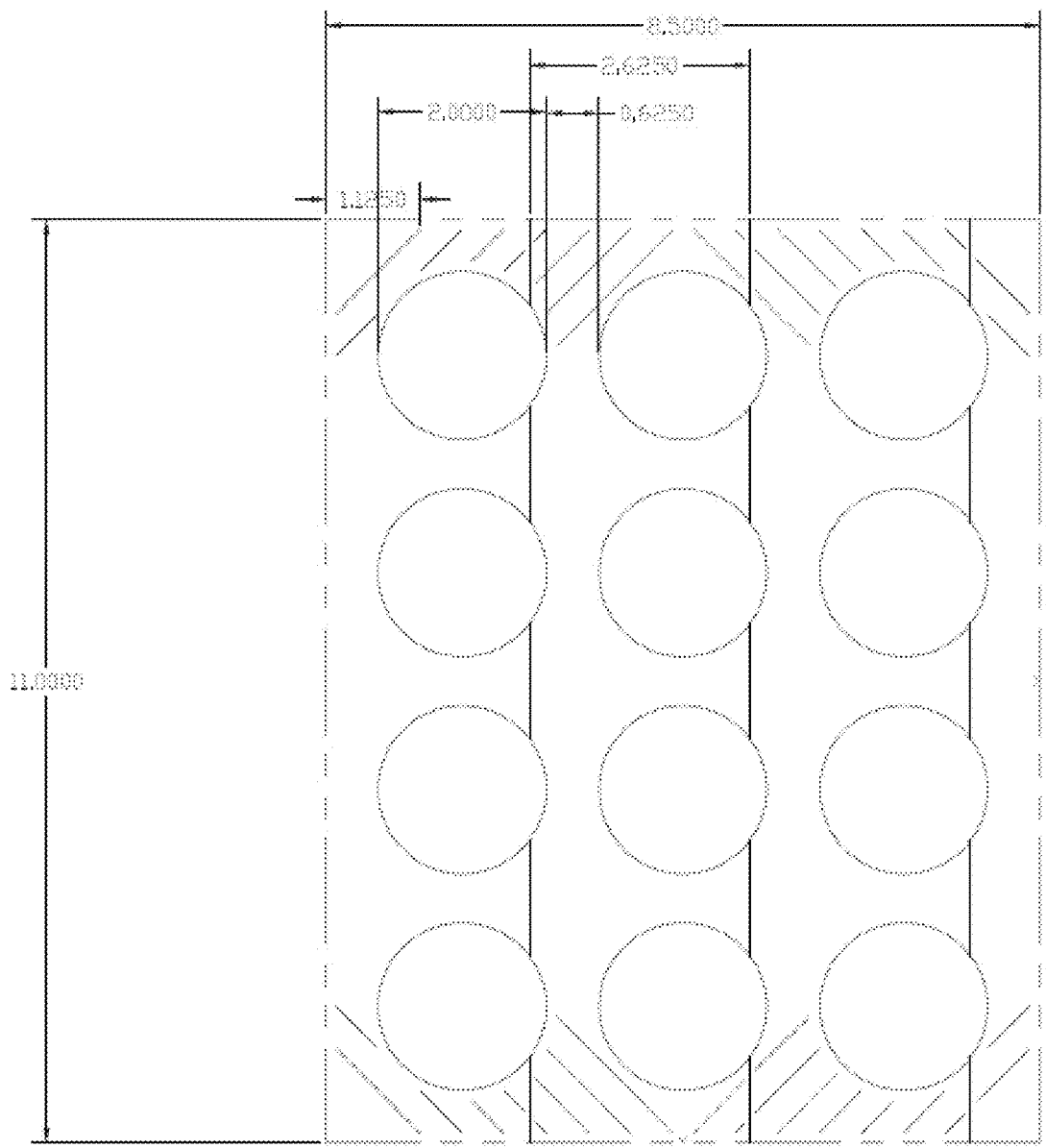
FIG. 7 is a plan view of an embodiment of the label sheet assembly in accordance with an embodiment of the present disclosure.
Figure 8:
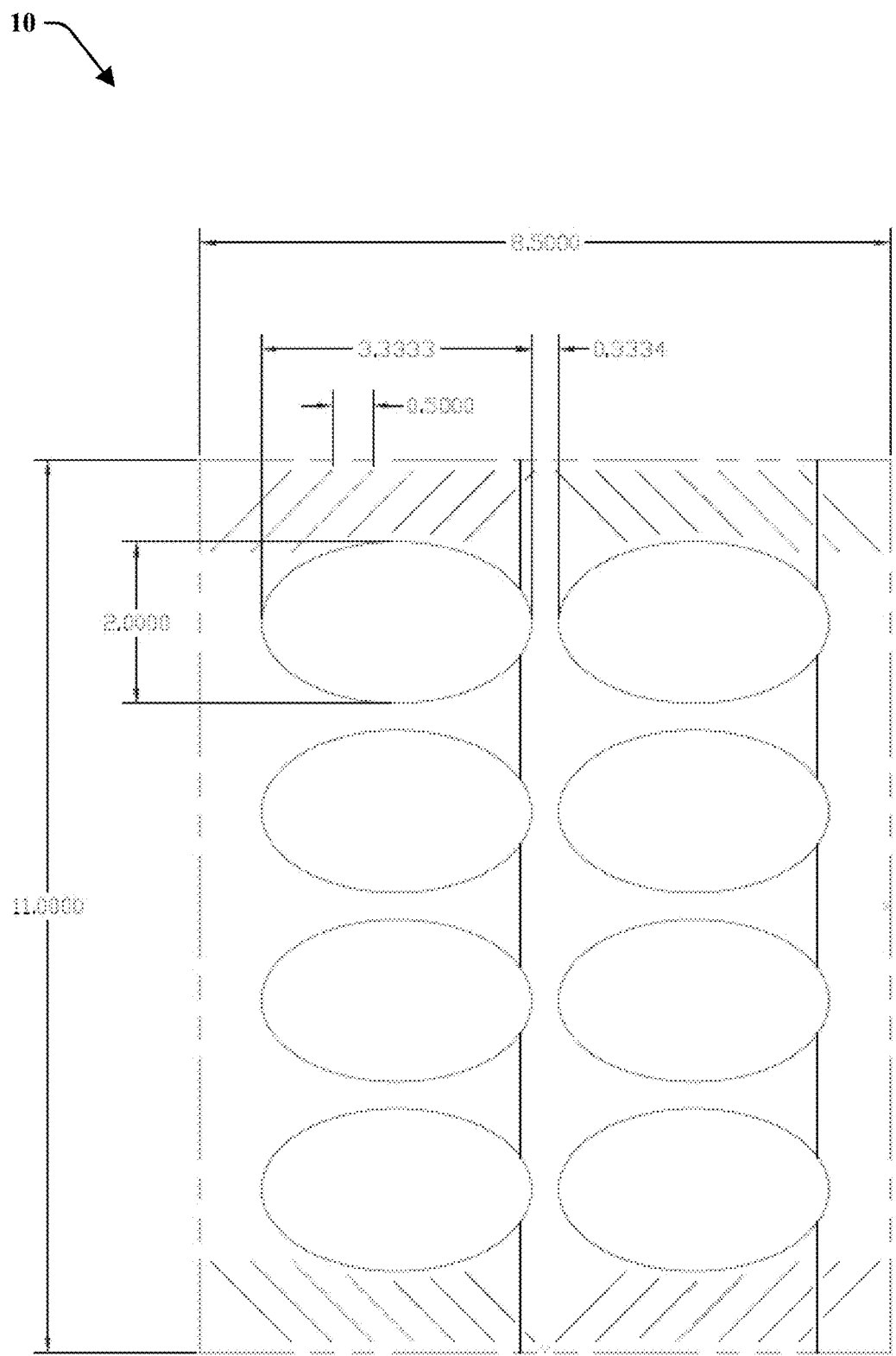
FIG. 8 is a plan view of an embodiment of the label sheet assembly in accordance with an embodiment of the present disclosure.
Figure 9:
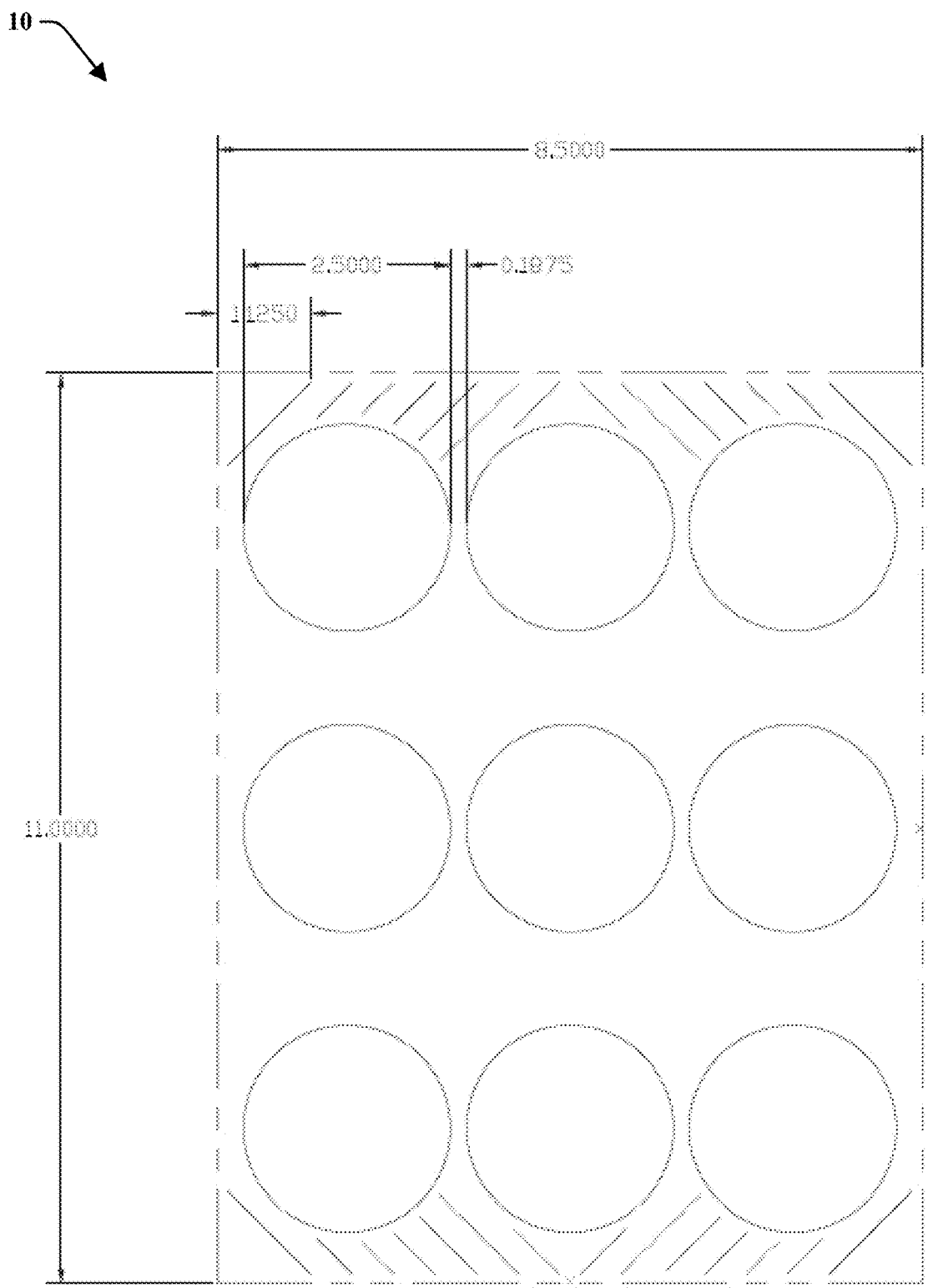
FIG. 9 is a plan view of an embodiment of the label sheet assembly in accordance with an embodiment of the present disclosure.
Figure 10:
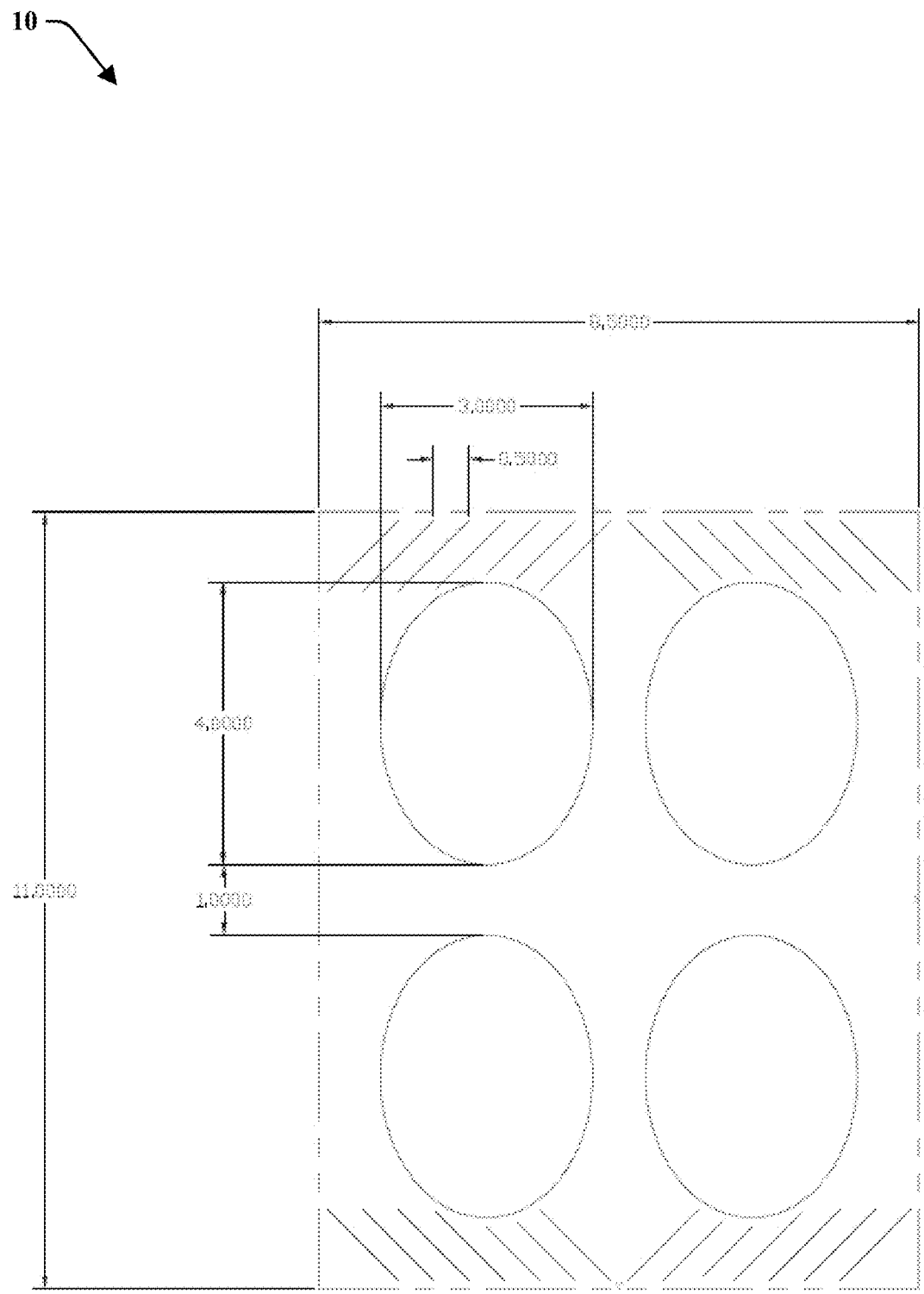
FIG. 10 is a plan view of an embodiment of the label sheet assembly in accordance with an embodiment of the present disclosure.

The discontinuous cut lines 80 may be spaced from one another approximately 0.5" along the header and footer of the assembly. Additionally, the diagonal orientation of the discontinuous cut lines 80 may be between about 30 degrees to about 60 degrees relative to the first edge 12 and more particular may be about 45 degrees from the first edge 12. As illustrated by FIG. 7, the plurality of discontinuous cut lines 80 may be spaced inwardly from the first edge 12 and the third edge 16 about 1.125" as the plurality of discontinuous cut lines 80 may be spaced from one another about 0.5". The labels defined within the facestock layers may have various sizes and configurations as illustrated by FIGS. 6-10 and this disclosure is not limited as such. The diagonal orientation of the discontinuous cut lines 80 may impart reduction in bending stiffness in the margins of the label sheet assembly 10 without concerns that the weakened matrix area may become too flexible and prematurely bend at an infeed area of printers. It may be likely that discontinuous cut lines positioned generally horizontal relative to the first and second edges 12, 14 may be subject to premature bending at the infeed areas of printers.

Figure 11:
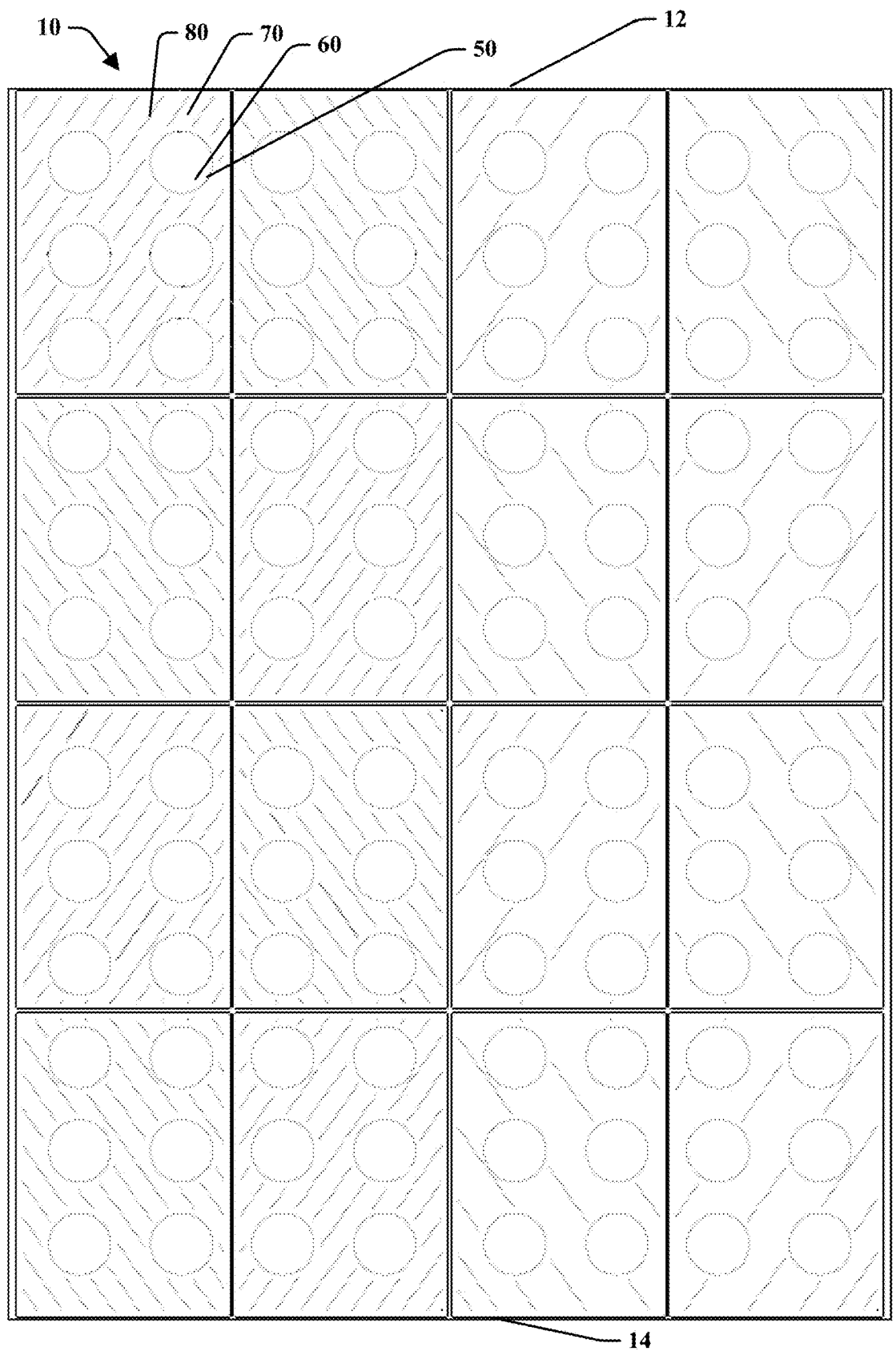
FIG. 11 is a plan view of an embodiment of the label sheet assemblies in accordance with embodiments of the present disclosure.

FIG. 11 is a plan view of various embodiments of label sheet assemblies 10 in accordance with embodiments of the present disclosure. Here four (4) label sheet assemblies 10 are illustrated, each having labels 60 formed in a generally circular shape wherein each label sheet assembly 10 includes twenty four (24) labels. However, various label shapes and amounts are contemplated and this disclosure is not limited in this regard. In these embodiments, each label sheet 10 includes four quadrants or groups as will be further described relative to FIGS. 14 and 16. In each group, the discontinuous cut lines 80 may be oriented in a common diagonal pattern along the matrix portion including along the header and footer areas as well as between portions of the labels 60. The discontinuous cut lines 80 may be generally parallel to one another and include various angles and spacing distances from one another.

In the first and second column of groups of the label assemblies 10 of FIG. 11, the discontinuous cut lines 80 include an angled orientation in either a first direction or an opposite second direction relative to the edges of the assembly. Additionally, each of the discontinuous cut lines 80 may be spaced from one another by approximately 10 mm (approximately 0.4") as the discontinuous cut lines 80 may be positioned along the matrix portion 70. There may be about sixteen (16) discontinuous cut lines 80 being in general alignment that do not intersect with the cut lines 50 that define the labels 60. However, any number of discontinuous cut lines 80 may be oriented in various arrangements along the matrix 70.

In the third and fourth columns of groups of the label assemblies 10 of FIG. 11, the discontinuous cut lines 80 include an angled orientation in either a first direction or an opposite second direction. Additionally each of the discontinuous cut lines 80 may be spaced from one another by various distances including about 10 mm (0.4"), 15 mm (0.6"), 20 mm (0.8"), 25 mm (1.0"), 30 mm (1.2"), and 35 mm (1.4") wherein each of these spacing distances are approximates. These spacing distances may be generally progressive along the surface of the matrix 70 wherein each subsequent discontinuous cut line 80 may be spaced further from the last beginning at the corner of the assembly 10. For example, there may be a discontinuous cut line 80 spaced from the next discontinuous cut line about 10 mm at a corner of the assembly 10 wherein the next discontinuous cut line 80 is spaced 15 mm, the next being 20 mm, the next being 25 mm and so on. There may be about seven (7) discontinuous cut lines arranged along the matrix 70 being in general alignment that do not intersect with the cut lines 50 that define the labels 60. However, any number of discontinuous cut lines 80 may be used in various arrangements along the matrix 70.

The diagonal orientation of the discontinuous cut lines 80 may impart reduction in bending stiffness in the margins of the label sheet assembly 10 without concerns that the weakened matrix area may become too flexible and prematurely bend at an infeed area of printers. It may be likely that discontinuous cut lines 80 may improve printer feeding as well as improve a curling effect that may occur after a label sheet assembly has been processed through a printer.

Figure 12:
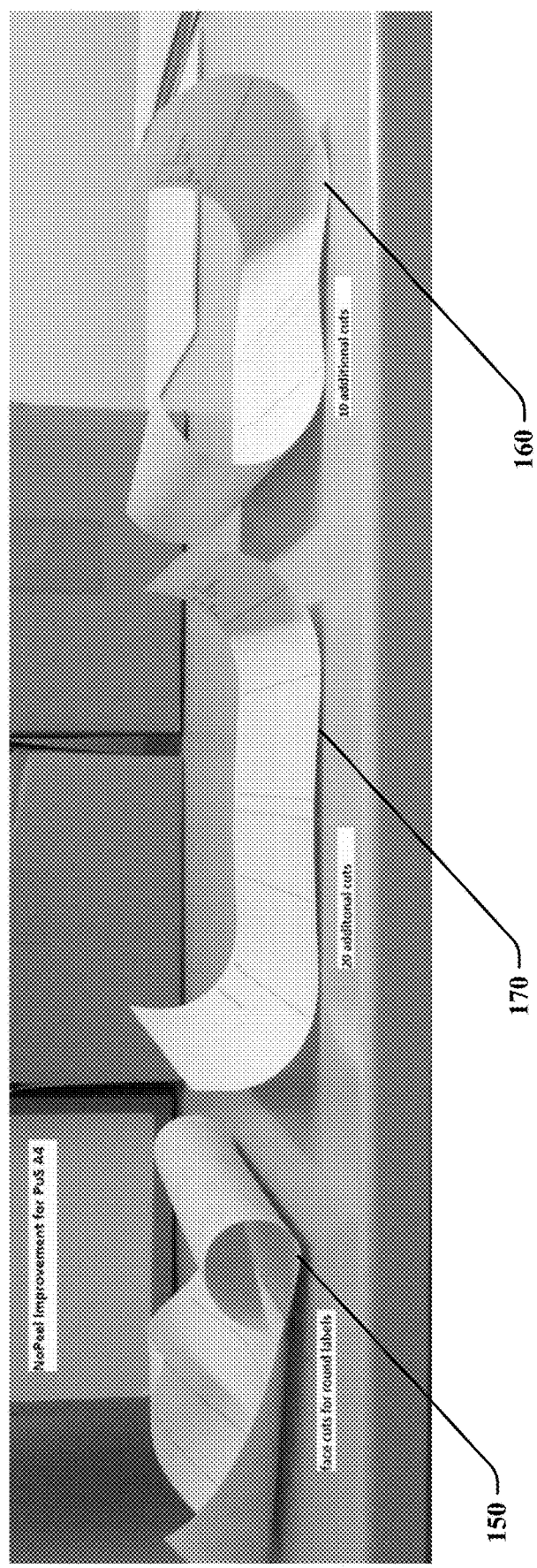
FIG. 12 is an illustration of various sheet assemblies after having been processed through a laser printer in accordance with the present disclosure.

FIG. 12 is an illustration of various sheet assemblies after having been processed through a printer device that has been found to cause curling to label sheets. Sheet assemblies 150, 160, and 170 illustrate various embodiments of the use of discontinuous cut lines 80 positioned along the matrix 70 of various embodiments of sheet assemblies 10. Each sheet assembly 150, 160, 170, has been passed through a printer device and experiences various degrees of curling due to the printing process. In these embodiments, the curling effect is upwards towards the printable surface portion of the labels 60.

Label sheet assembly 150 includes a plurality of round labels thereon and a plurality of discontinuous cut lines 80. Sheet assembly 150 illustrates a substantial degree of curling after having been processed through a printer device.

Label sheet assembly 160 includes a plurality of round labels 60 thereon and ten (10) more discontinuous cut lines 80 than label sheet assembly 150. Label sheet assembly 160 illustrates a lesser degree of curling after having been processed through a printer device than label sheet assembly 150.

Label sheet assembly 170 includes a plurality of round labels 60 thereon and twenty (20) more discontinuous cut lines 80 than label sheet assembly 150. Label sheet assembly 170 illustrates a lesser degree of curling after having been processed through a printer device than both label sheet assembly 150 and label sheet assembly 160. The configuration of the plurality of discontinuous cut lines 80 may be arranged to improve the ability of the label sheet 10 to be processed through a printer and reduce curling effect. This may allow processed label sheets 10 to be stacked against one another without becoming stuck or to reduce nesting between stacked label sheets 10. Notably, the embodiments illustrated by FIGS. 13 through 20 improve on the lay-flat properties experienced by the label sheet assemblies 150, 160, and 170 such that they experienced a reduced curling effect after being processed through a printer, such as a laser printer.

Figure 13:
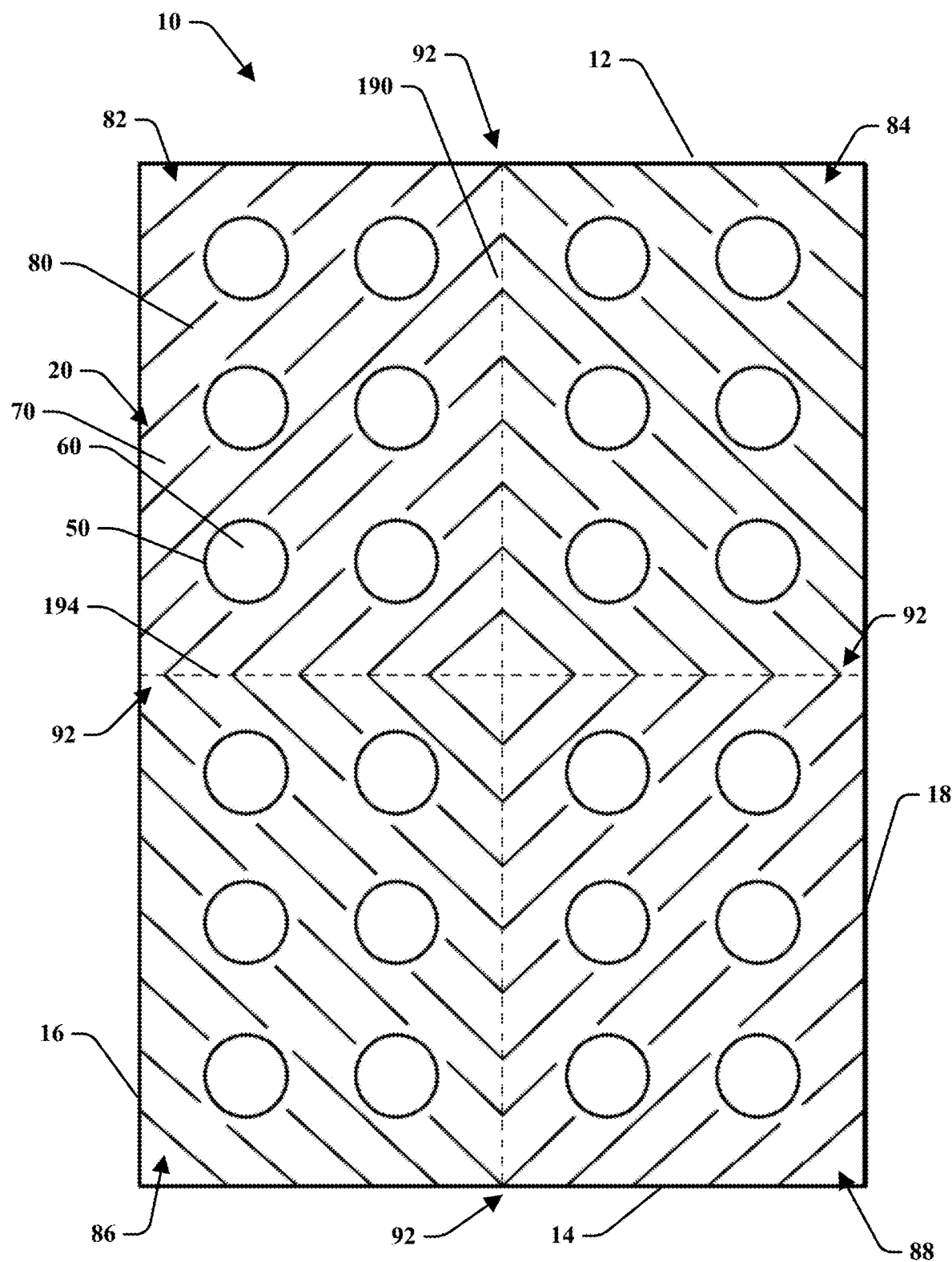
FIG. 13 is a plan view of an embodiment of the label sheet assembly in accordance with an embodiment of the present disclosure.
Figure 14:
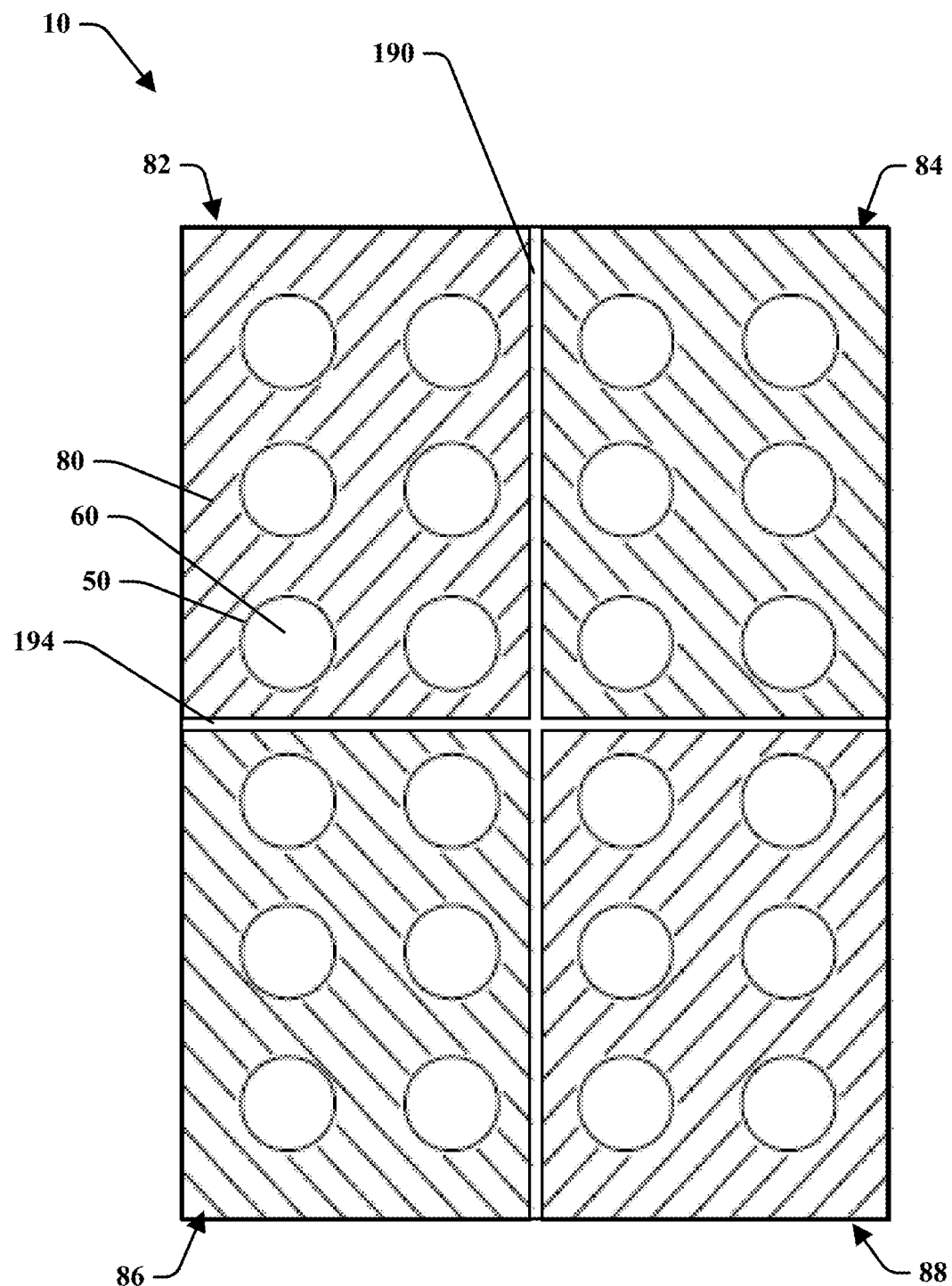
FIG. 14 is a plan view of an embodiment of the label sheet assembly in accordance with an embodiment of the present disclosure.
Figure 15:
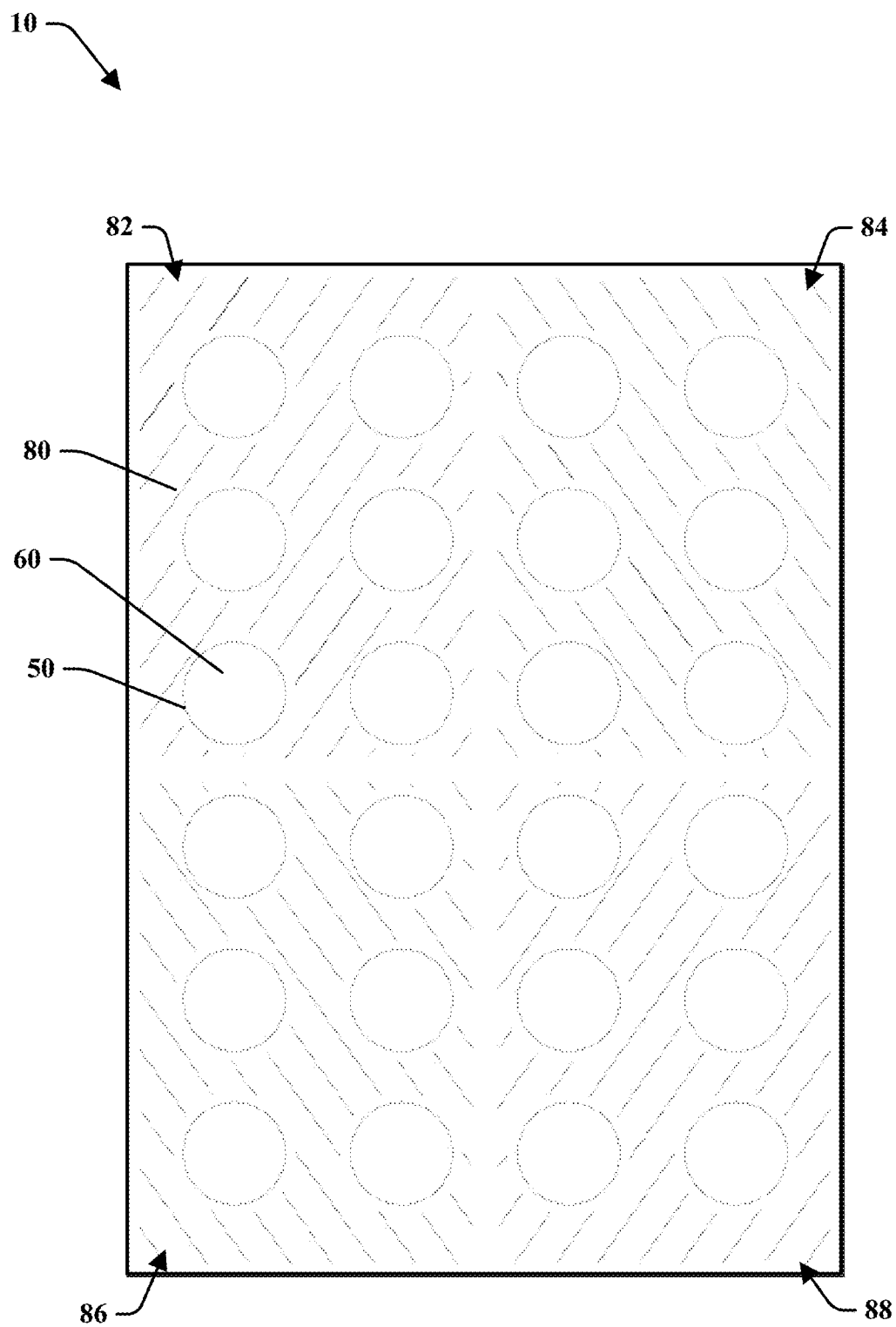
FIG. 15 is a plan view of an embodiment of the label sheet assembly in accordance with an embodiment of the present disclosure.

FIGS. 13 through 20 illustrate various additional embodiments of the sheet assembly 10 in accordance with the present disclosure. FIG. 13 illustrates a sheet assembly 10 having a plurality of die cut lines 50 that define a plurality of labels 60 along the facestock 20. The label sheet assembly 10 may include a plurality of discontinuous cut lines 80 positioned along the matrix portion 70. The discontinuous cut lines 80 may extend between the labels 60 and the first, second, third, and fourth edges 12, 14, 16, 18 as illustrated. The plurality of discontinuous cut lines 80 may be generally straight cut lines and may have a generally diagonal orientation relative to the edges and may be spaced from the cut lines 50 and the edges 12, 14, 16, 18. Alternatively, the plurality of discontinuous cut lines 80 may intersect the edges 12, 14, 16, 18 or the cut lines 50. The plurality of discontinuous cut lines 80 may be generally parallel relative to each other and have a generally diagonal orientation relative to the first and second edges 12, 14 or otherwise along the feed direction of the sheet assembly 10. The label sheet 10 of FIG. 13 includes a first separation line 190 that may separate the label sheet 10. The first separation line 190 may extend between the first edge 12 and the second edge 14. A second separation line 194 may also separate the label sheet 10. The second separation line 194 may extend between the third edge 16 and the fourth edge 18. In one embodiment, as illustrated by FIG. 13, the separation lines 190, 194 are weakened separation lines with a plurality of cuts and ties. These separation lines 190, 194 may separate through the label sheet 10 along mid points of the respective edges. In another embodiment, as illustrated by FIG. 14, the separation lines 190, 194 may be cut lines along the matrix 70 that define the perimeter of various sheets of labels that make up the label sheet 10 and may be detached from one another to peal or otherwise dispense labels 60 from the sheets 10 after having received indicia thereon such as through a printing operation. These various sheets may have different groups or arrangements of the discontinuous cut lines 80 and labels 60 as will be discussed below. In yet another embodiment, as illustrated by FIG. 15, the label sheet 10 may not include separation lines 190, 194 but may include various quadrants having discontinuous cut lines 80 as arranged within the matrix 70 portions of the facestock 20. The quadrants may be arranged with discontinuous cut lines 80 as described below. Further, any quantity, shape, and type of separation lines 190, 194 may be utilized along the label sheet 10 and this disclosure is not limited in this regard.

The label sheet 10 may include a first group 82 of discontinuous cut lines 80 that are oriented in a first generally diagonal orientation and a second group 84 of discontinuous cut lines that are oriented in a second generally diagonal orientation. The first group 82 of discontinuous cut lines 80 may have an opposite diagonal orientation from the second group 84. The first group 82 of discontinuous cut lines 80 may extend between the third edge 16, the first edge 12, the first separation cut line 190, and the second separation cut line 194. The second group 84 of discontinuous cut lines 80 may extend between the fourth edge 18, the first edge 12, the first separation cut line 190, and the second separation cut line 194. The first group and second group 82, 84 may include discontinuous cut lines 80 aligned in a configuration that forms an apex 92 along the first separation cut line 190 of the sheet 10 adjacent the first edge 12.

Additionally, there may be a third group 86 of discontinuous cut lines 80 that are oriented in the second generally diagonal orientation and a fourth group 88 of discontinuous cut lines that are oriented in the first generally diagonal orientation. The third group 86 may have an opposite diagonal orientation from the fourth group 88. In one embodiment, the third group 86 may have a similar diagonal orientation as the second group 84 and the fourth group 88 may have a similar diagonal orientation as the first group 82. The third group 82 of discontinuous cut lines 80 may extend between the third edge 16, the second edge 14, the first separation cut line 190, and the second separation cut line 194. The fourth group 88 of discontinuous cut lines 80 may extend between the fourth edge 18, the second edge 14, the first separation cut line 190, and the second separation cut line 194.

Figure 16:
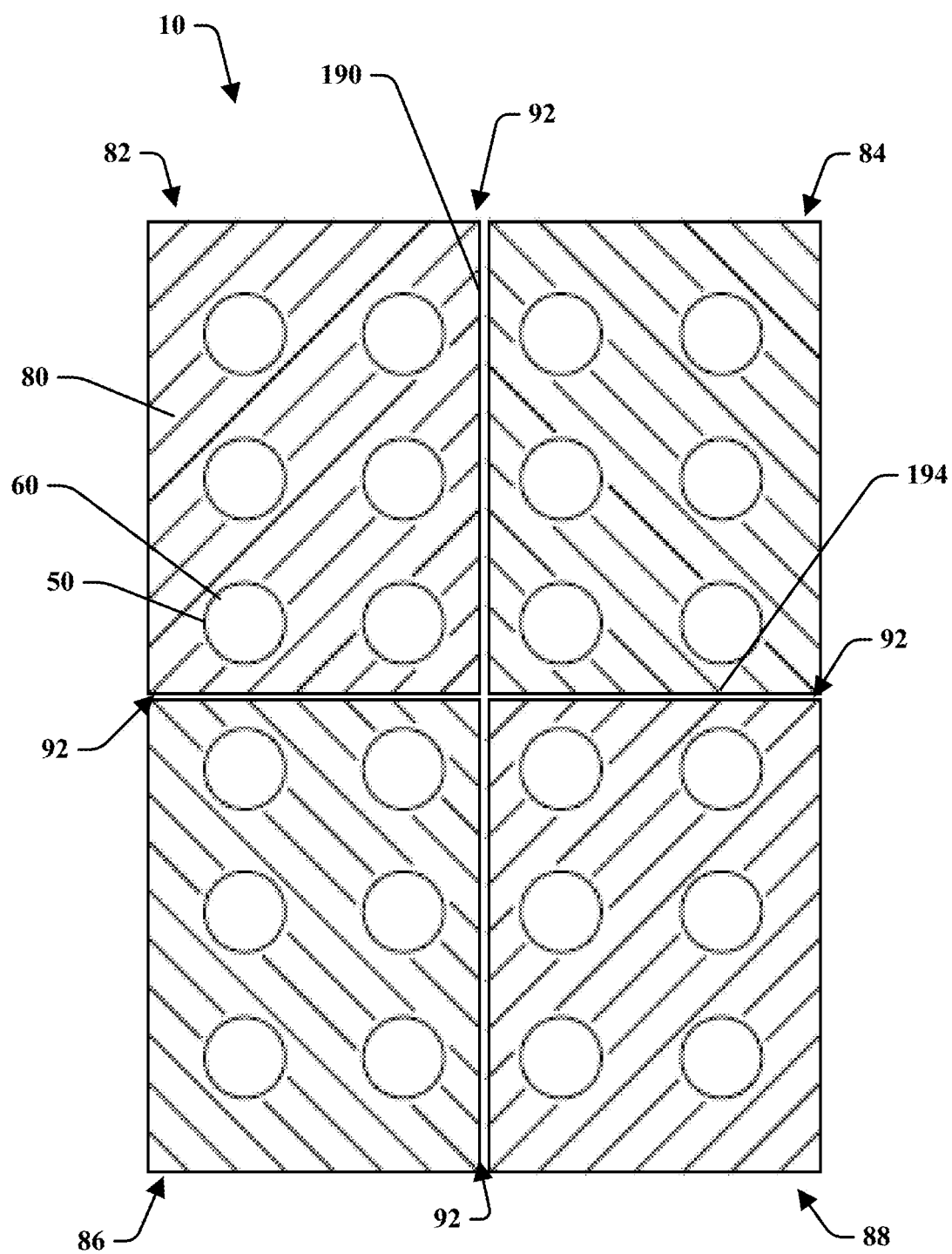
FIG. 16 is a plan view of an embodiment of the label sheet assembly in accordance with an embodiment of the present disclosure.
Figure 17:
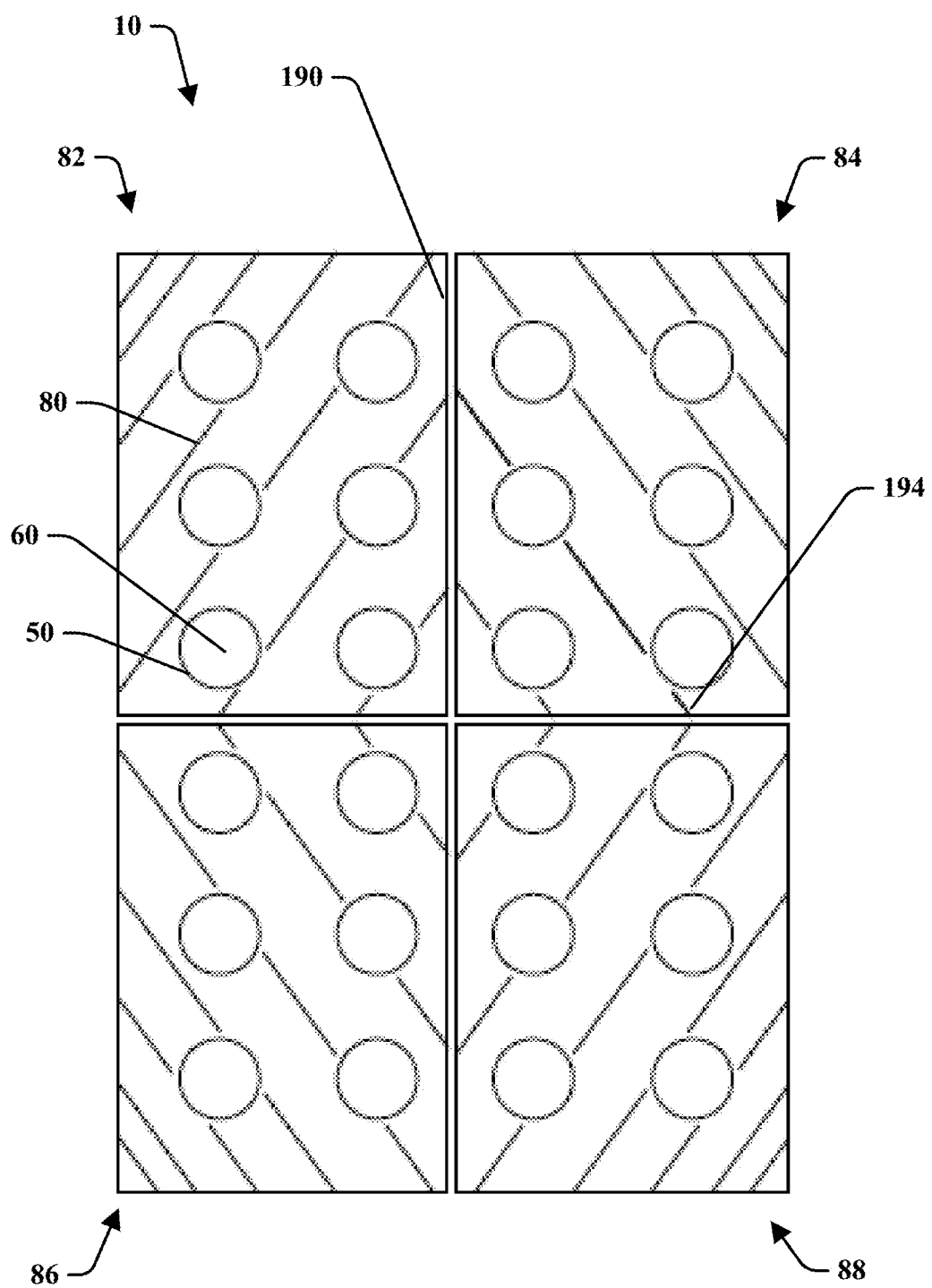
FIG. 17 is a plan view of an embodiment of the label sheet assembly in accordance with an embodiment of the present disclosure.
Figure 18:
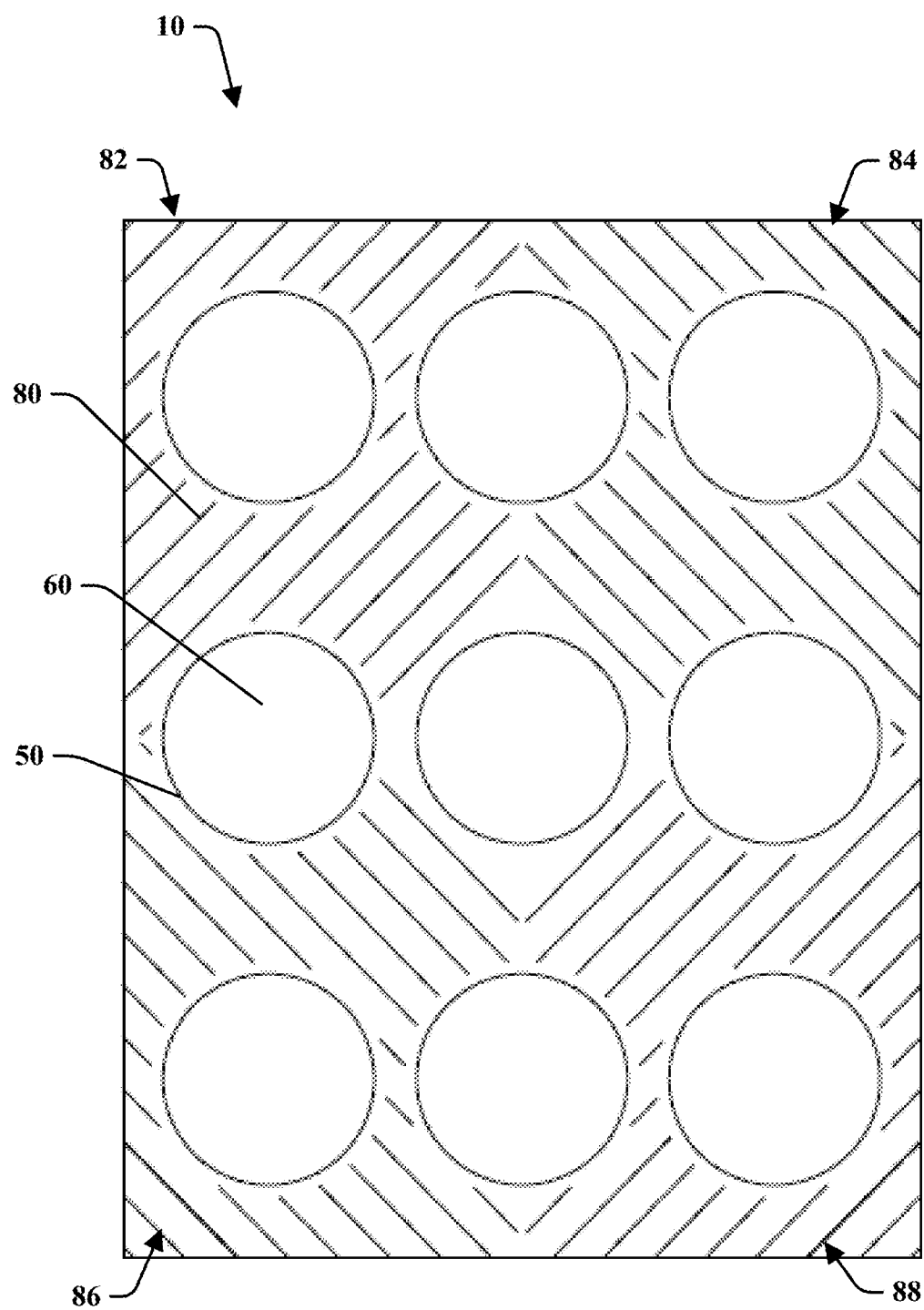
FIG. 18 is a plan view of an embodiment of the label sheet assembly in accordance with an embodiment of the present disclosure.

Further, as illustrated by FIGS. 16, 17, and 18, the label sheet 10 may include discontinuous cut lines 80 arranged in various orientations. The facestock 20 may include various quantities of cut lines 50 to define the labels 60 thereon. As such the various number and size of the labels 60 may effect the quantity and arrangement of the discontinuous cut lines 80 positioned along the label sheet 10. FIG. 16 illustrates an embodiment having a greater number of discontinuous cut lines 80 than the label sheet 10 illustrated by FIG. 14. Here, the first group 82 and the third group 86 may include discontinuous cut lines 80 aligned in a configuration that forms an apex 92 along the second separation cut line 194 of the sheet 10 adjacent the third edge 16. The second group 84 and the fourth group 88 may include discontinuous cut lines 80 aligned in a configuration that forms an apex 92 along the second separation cut line 194 of the sheet 10 adjacent the fourth edge 18. As such, the plurality of spaced discontinuous cut lines 80 of each group may be generally aligned with each other group relative to the separation lines 190, 194.

FIG. 17 illustrates an embodiment of the label sheet 10 having discontinuous cut lines with generally progressive spacing along the surface of the matrix 70 wherein each subsequent discontinuous cut line 80 may be spaced further from the last. For example, there may be a discontinuous cut line 80 spaced from the next discontinuous cut line about 10 mm at a corner of the assembly 10 wherein the next discontinuous cut line 80 is spaced 15 mm, the next being 20 mm, the next being 25 mm and so on. There may be about seven (7) discontinuous cut lines arranged along the matrix 70 being in general alignment that do not intersect with the cut lines 50 that define the labels 60. However, any number of discontinuous cut lines 80 may be used in various arrangements along the matrix 70.

FIG. 18 illustrates an embodiment wherein the label sheet 10 includes a plurality of labels 60 without separation lines 190, 194. Here, the labels 60 may be aligned along a position that generally separates the groups 82, 84, 86, and 88 and angular configuration of the discontinuous cut lines 80 from each group. The discontinuous cut lines 80 may intersect the edges or the labels. Also, the discontinuous cut lines may spaced from the edges and the labels.

Figure 19:
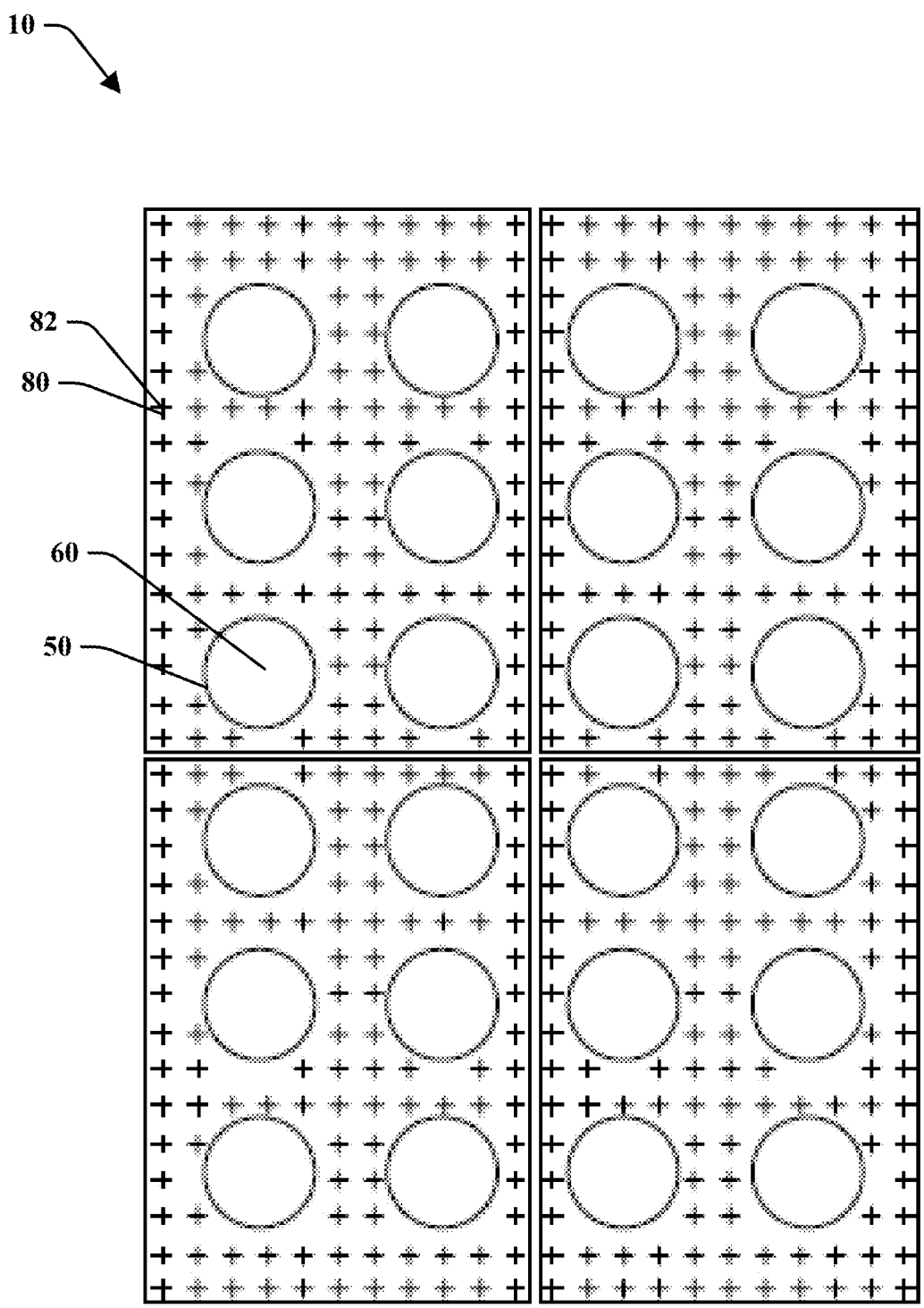
FIG. 19 is a plan view of an embodiment of the label sheet assembly in accordance with an embodiment of the present disclosure.
Figure 20:
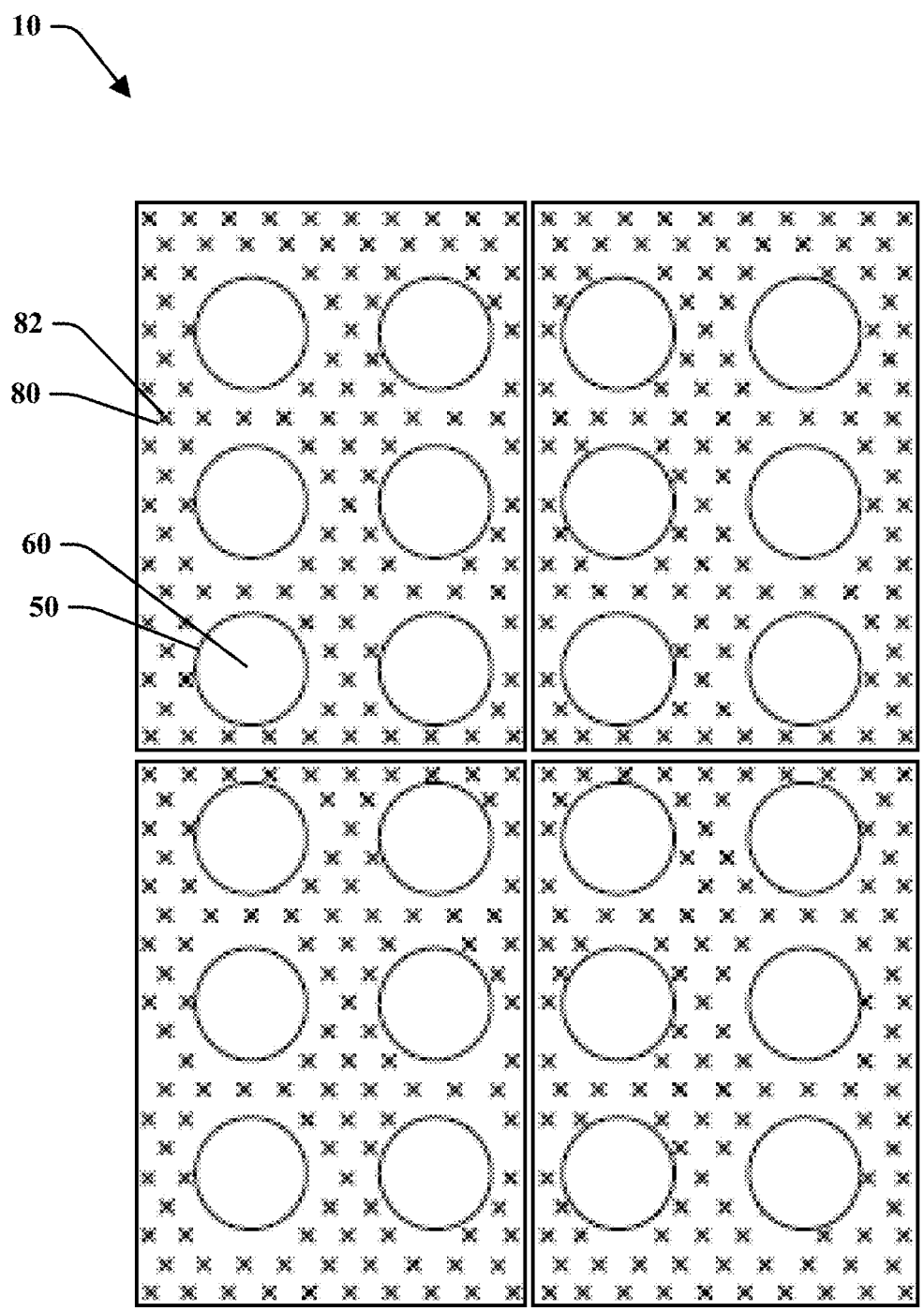
FIG. 20 is a plan view of an embodiment of the label sheet assembly in accordance with an embodiment of the present disclosure.

As illustrated by FIGS. 19 and 20, the discontinuous cut lines 80 may be arranged in various patterns along the matrix 70 of the label sheet 10. The discontinuous cut lines 80 may be shaped as an intersecting pattern 82 such as crosses or as an "x" while aligned along the matrix 70 of the label sheet 10. These intersecting patterns 82 may be arranged in aligned rows or in a scattered random orientation. Also, various sized discontinuous cut lines 80 may be used and various number of intersection patterns 82 are contemplated. The intersecting patterns 82 may extend along the entire matrix 70 of the label sheet 10 or only be positioned along a portion of the label sheet 10 such as along the header or as along the footer and this disclosure is not limited.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The features of each embodiment described and shown herein may be combined with the features of the other embodiments described herein. The claims as follows are intended to include all modifications and alterations insofar as they come within the scope of the claims or the equivalent thereof.

We claim:

1. A label sheet assembly comprising:
   a facestock layer having at least one continuous cut line that defines at least one label and a matrix portion wherein the facestock layer is configured to receive indicia thereon, the facestock layer including a header and an opposite footer;
   an adhesive layer;
   a liner sheet layer; and
   a plurality of discontinuous cut lines are generally straight cut lines provided along the header or footer of the facestock layer wherein the discontinuous cut lines create a zone of decreased bending stiffness along the label sheet assembly and are oriented to include a first group of the plurality of discontinuous cut lines in a first generally diagonal orientation relative to a feed direction of the sheet assembly and a second group of the plurality of discontinuous cut lines are oriented in a second generally diagonal orientation relative to the feed direction of the sheet assembly, the first group and the second group of discontinuous cut lines are aligned to form an apex along a center axis of the facestock layer, the zone of decreased bending stiffness including at least one weakened separation line;
   wherein said discontinuous cut lines reduce lifting, shifting, or bending of the matrix portion relative to the liner layer when the label sheet assembly is processed through a printer, and wherein the discontinuous cut lines reduce a curling effect when the label sheet assembly is processed through a printer.

2. The label sheet assembly according to claim 1, wherein the matrix portion extends from the at least one label to an edge of the label sheet assembly.

3. The label sheet assembly according to claim 1, wherein the matrix portion includes at least one discontinuous cut line spaced from the cut line that defines at least one label.

4. The label sheet assembly according to claim 1, wherein the facestock layer is a label.

5. The label sheet assembly according to claim 1, wherein the at least one weakened separation line divides the sheet assembly into a plurality of sections.

6. A label sheet assembly comprising:

a facestock layer having at least one continuous cut line that defines at least one label and a matrix portion wherein the facestock layer is configured to receive indicia thereon, the facestock layer includes a first edge with an opposite second edge, and a third edge with an opposite fourth edge such that the edges intersect to form a generally rectangular sheet assembly wherein the first and second edges define a feed direction such that the label sheet assembly is configured to be fed into a conventional printer from the first edge or the second edge;

a liner sheet layer is attached to the facestock layer with an adhesive layer between the liner sheet layer and the facestock layer; and a plurality of discontinuous cut lines are generally straight cut lines positioned along the matrix portion of the facestock layer to create a zone of decreased bending stiffness along the label sheet assembly, wherein the plurality of discontinuous cut lines are positioned adjacent along either the first edge or the second edge and have a generally diagonal orientation relative to the first and second edges along the feed direction of the sheet assembly;

a first group of the plurality of discontinuous cut lines oriented in a first generally diagonal orientation and a second group of the plurality of discontinuous cut lines oriented in a second generally diagonal orientation wherein the first group have an opposite diagonal orientation from the second group wherein the first group of discontinuous cut lines extend between the third edge to a center axis of the sheet assembly and the second group of discontinuous cut lines extend between the fourth edge to the center axis of the sheet assembly, wherein the first group and second group of discontinuous cut lines form an apex along the center axis of the sheet adjacent to at least one of the first and second edges, wherein said discontinuous cut lines reduce lifting, shifting, or bending of the matrix portion relative to the liner layer when the label sheet assembly is processed through a printer, and wherein the discontinuous cut lines reduce a curling effect when the label sheet assembly is processed through a printer.

7. The label sheet assembly according to claim 6, wherein the discontinuous cut lines extend between the at least one label and the first, second, third, and fourth edges.

8. The label sheet assembly according to claim 6, wherein the plurality of discontinuous cut lines are generally straight cut lines and include a generally diagonal orientation relative to the first, second, third, and fourth edges.

9. The label sheet assembly according to claim 6, wherein the plurality of discontinuous cut lines are spaced from the at least one cut line that defines the label.

10. The label sheet assembly according to claim 6, wherein the plurality of discontinuous cut lines are generally parallel relative to each other.

11. The label sheet assembly according to claim 6, further comprising a first separation line that extends from the first edge to the second edge and a second separation line that extends from the third edge to the fourth edge.

12. The label sheet assembly according to claim 6, further comprising quadrants having discontinuous cut lines arranged within the matrix portions of the facestock wherein each quadrant includes discontinuous cut lines arranged in a first group oriented in a first generally diagonal orientation or a second group oriented in a second generally diagonal orientation wherein the first group of discontinuous cut lines has an opposite diagonal orientation from the second group.

* * * * *